(12) United States Patent
Geng et al.

(10) Patent No.: US 11,963,218 B2
(45) Date of Patent: Apr. 16, 2024

(54) COMMUNICATIONS METHOD AND COMMUNICATIONS APPARATUS

(71) Applicant: HUAWEI TECHNOLOGIES CO., LTD., Guangdong (CN)

(72) Inventors: Tingting Geng, Shanghai (CN); Le Yan, Shenzhen (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 257 days.

(21) Appl. No.: 17/203,992

(22) Filed: Mar. 17, 2021

(65) Prior Publication Data

US 2021/0204314 A1 Jul. 1, 2021

Related U.S. Application Data

(63) Continuation of application No. PCT/CN2019/106173, filed on Sep. 17, 2019.

(30) Foreign Application Priority Data

Sep. 18, 2018 (CN) .......................... 201811090248.6

(51) Int. Cl.
*H04W 74/00* (2009.01)
*H04W 72/12* (2023.01)
(Continued)

(52) U.S. Cl.
CPC ....... *H04W 74/006* (2013.01); *H04W 72/121* (2013.01); *H04W 72/54* (2023.01)

(58) Field of Classification Search
CPC ..... H04W 12/08; H04W 12/60; H04W 12/71; H04W 12/76; H04W 4/08; H04W 72/121;
(Continued)

(56) References Cited

U.S. PATENT DOCUMENTS

2009/0252165 A1* 10/2009 Zhang ............... H04W 52/0229
370/390
2013/0044646 A1 2/2013 Qu et al.
(Continued)

FOREIGN PATENT DOCUMENTS

| CN | 102238512 A | 11/2011 |
| CN | 102647667 A | 8/2012 |

(Continued)

OTHER PUBLICATIONS

Nokia et al :F1-CUE associated functions 3GPP TSG RAN WG3 AdHoc NR R3-172330,Jun. 29, 2017 ,total 3 pages.
(Continued)

*Primary Examiner* — Liton Miah
(74) *Attorney, Agent, or Firm* — WOMBLE BOND DICKINSON (US) LLP

(57) ABSTRACT

This application provides a communications method and a communications apparatus, to reduce storage resources required by an access network device to store a context of a terminal device. The method includes: The access network device gathers terminal devices that have a same attribute in a group, where a context of each terminal device is divided into two parts: a common context and a dedicated context, the common context is shared by all the terminal devices in the group, and the dedicated context is a context specific to the terminal device. The access network device stores one common context for each group and stores a dedicated context of each terminal device in the group, to maintain the context of each terminal device.

19 Claims, 9 Drawing Sheets

Core network device 110

Access network device 120

Terminal device 130A

Terminal device 130B

Terminal device 130C

Terminal device 130D

(51) Int. Cl.
*H04W 72/121* (2023.01)
*H04W 72/54* (2023.01)

(58) Field of Classification Search
CPC ... H04W 72/54; H04W 74/006; H04W 76/10; H04W 76/11
See application file for complete search history.

(56) References Cited

U.S. PATENT DOCUMENTS

| | | | | |
|---|---|---|---|---|
| 2013/0189951 | A1* | 7/2013 | Lopez | H04W 68/005 455/411 |
| 2013/0337860 | A1* | 12/2013 | Xu | H04L 67/55 455/518 |
| 2014/0011527 | A1* | 1/2014 | Xu | H04W 4/08 455/466 |
| 2014/0064231 | A1* | 3/2014 | Park | H04W 74/002 370/329 |
| 2014/0146809 | A1 | 5/2014 | Xing et al. | |
| 2014/0219178 | A1* | 8/2014 | Lopez | H04W 36/0038 370/328 |
| 2014/0341038 | A1* | 11/2014 | Lim | H04W 28/08 370/235 |
| 2018/0124741 | A1* | 5/2018 | Lu | H04W 16/32 |
| 2020/0187153 | A1* | 6/2020 | Saily | H04W 76/10 |

FOREIGN PATENT DOCUMENTS

| | | |
|---|---|---|
| CN | 102905252 A | 1/2013 |
| CN | 106535135 A | 3/2017 |
| CN | 110519709 A | 11/2019 |
| CN | 113938845 A | 1/2022 |
| EP | 3780667 A1 | 2/2021 |

OTHER PUBLICATIONS

Huawei et al:Solution for Group Communication for IoT-V2XSIDs SA WG2 Meeting #128bis S2-188561 Aug. 24, 2018, total 12 pages.
Qualcomm Incorporated, Context Retrieval in RRC INACTIVE. 3GPP TSG-RAN WG2 Meeting NR Ad-Hoc 2, Qingdao, China, Jun. 27-29, 2017, R3-172431, 3 pages.

* cited by examiner

COMMUNICATIONS METHOD AND COMMUNICATIONS APPARATUS

CROSS-REFERENCE TO RELATED APPLICATIONS

This application is a continuation of International Application No. PCT/CN2019/106173, filed on Sep. 17, 2019, which claims priority to Chinese Patent Application No. 201811090248.6, filed on Sep. 18, 2018. The disclosures of the aforementioned applications are hereby incorporated by reference in their entireties.

TECHNICAL FIELD

This application relates to the communications field, and more specifically, to a communications method and a communications apparatus.

BACKGROUND

In a current access technology, for terminal devices that access an access network device, the access network device needs to store a context for each terminal device. With social development, an increasing quantity of terminal devices access a network. For example, low power wide area (LPWA) user equipment (UE), and various intelligent terminals need to access the network. A fifth generation (5G) network further needs to support millions of connections. When a large quantity of terminal devices access a same access network device, if the access network device stores a context for each terminal device, a large quantity of storage resources of the access network device are consumed.

SUMMARY

This application provides a communications method and a communications apparatus, to reduce storage resources or signaling overheads required by an access network device to maintain a context of a terminal device.

According to a first aspect, this application provides a communications method. The method includes: receiving a first message from a first access network device, where the first message includes a group identifier corresponding to the terminal device and an identifier of the terminal device, the group identifier is used to identify a group to which the terminal device belongs, the identifier of the terminal device is used to identify the terminal device in the group to which the terminal device belongs, the group identifier corresponds to a common context, the common context is shared by all terminal devices in the group to which the terminal device belongs, and the identifier of the terminal device corresponds to a dedicated context of the terminal device; and storing the group identifier and the identifier of the terminal device.

According to the communications method in an embodiment of the application, terminal devices are gathered in a group, so that a context of each terminal device includes a common context corresponding to a group identifier and a dedicated context corresponding to an identifier of the terminal device. All terminal devices in each group share a same common context, and each terminal device uses a dedicated context. In this way, when maintaining contexts of the terminal devices, an access network device does not need to store an entire context of each terminal device, so that resource requirements of the access network device on maintaining contexts can be reduced. For example, if the terminal device is the first terminal device in the group that accesses the first access network device, the first access network device may configure and store the common context corresponding to the group to which the terminal device belongs and the dedicated context corresponding to the terminal device. If a context needs to be subsequently configured for another terminal device that belongs to the group, the first access network device needs to configure and store only a dedicated context of the another terminal device. If the first access network device already stores, before configuring a context of the terminal device, the common context corresponding to the group corresponding to the terminal device, the first access network device does not need to store a common context corresponding to the terminal device.

In an embodiment, the common context may include one or more of the following information: a quality of service (QoS) attribute, a radio resource control (RRC) configuration, a service data adaptation protocol (SDAP) configuration, a data radio bearer (DRB) configuration, a capability of the terminal devices, and a security parameter type supported by the terminal devices. In other words, for a group, one or more of QoS attributes, RRC configurations, SDAP configurations, DRB configurations, capabilities of the terminal devices, and security parameter types supported by the terminal devices of all terminal devices in the group are the same.

Further, the QoS attribute may include one or more of the following: a priority level, packet delay budget, a packet error ratio, a delay-sensitive indication, an averaging window, and a maximum data burst volume.

In an embodiment, the dedicated context may include a security parameter. For example, the dedicated context of the terminal device may include a security parameter of the terminal device. The security parameter includes at least one of an integrity protection algorithm, an encryption algorithm, and a security key parameter. The security key parameter may be at least one of a key KgNB, a key next hop (NH), and a next hop chaining count (NCC). The security key parameter may further include a signaling plane and/or user plane key used for integrity protection and/or encryption protection. It should be understood that the dedicated context may alternatively be other information, or the dedicated context may further include other information in addition to the security parameter. This is not limited in an embodiment of the application. For example, the SDAP configuration information is not comprised in the common context, but the SDAP configuration information is comprised in the dedicated context. Alternatively, one part of the SDAP configuration information may be comprised in the common context, and the other part may be comprised in the dedicated context.

With reference to the first aspect, in an embodiment, the method may further include: receiving the common context from the first access network device.

With reference to the first aspect, in an embodiment, the method may further include: receiving the dedicated context from the first access network device.

With reference to the first aspect, in an embodiment, the method may further include: sending a second message to a second access network device, where the second message is used to request to access the second access network device, and the second message includes the identifier of the terminal device and the group identifier; or the second message is carried on a physical resource corresponding to the group identifier, and the second message includes the identifier of the terminal device.

The second message is sent to the second access network device, so that the second access network device can determine the identifier of the terminal device and the group identifier. Therefore, when the terminal device needs to access the second access network device, the second access network device may obtain the common context and the dedicated context from the first access network device based on the identifier of the terminal device and the group identifier.

According to a second aspect, a communications method is provided. The method includes: determining a group identifier corresponding to a terminal device and an identifier of the terminal device, where the group identifier is used to identify a group to which the terminal device belongs, the identifier of the terminal device is used to identify the terminal device in the group to which the terminal device belongs, the group identifier corresponds to a common context, the common context is shared by all terminal devices in the group to which the terminal device belongs, and the identifier of the terminal device corresponds to a dedicated context of the terminal device; and sending a first message to the terminal device, where the first message includes the group identifier and the identifier of the terminal device.

According to the communications method in an embodiment of the application, terminal devices are gathered in a group, so that a context of the terminal device includes a common context corresponding to a group identifier and a dedicated context corresponding to an identifier of the terminal device. All terminal devices in each group share a same common context, and each terminal device uses a dedicated context. In this way, when maintaining contexts of the terminal devices, an access network device does not need to store the entire context of each terminal device, so that resource requirements of the access network device on maintaining contexts can be reduced.

In an embodiment, the group identifier corresponding to the terminal device may be determined based on attribute information of the terminal devices and a preset rule. The attribute information of the terminal devices may be one or more of quality of service (QoS) attributes, service types of the terminal devices, slice types of the terminal devices, capabilities of the terminal devices, whether the terminal devices are static, power saving requirements of the terminal devices, and latency requirements of the terminal devices. The preset rule may define a correspondence between the group identifier and the attribute information of the terminal devices. Therefore, the group identifier corresponding to the terminal device may be determined based on the attribute information of the terminal devices.

With reference to the second aspect, in an embodiment, the method further includes: sending the common context to the terminal device.

With reference to the second aspect, in an embodiment, the method further includes: sending the dedicated context to the terminal device.

With reference to the second aspect, in an embodiment, the method further includes: sending a fourth message to a core network device, where the fourth message includes the group identifier, and the fourth message is used to request the core network device to configure a next generation application protocol stack/NG interface application layer protocol (NGAP) connection configuration parameter corresponding to the group identifier; and receiving the NGAP connection configuration parameter sent by the core network device.

With reference to the second aspect, in an embodiment, the method further includes: sending an activation request message to the core network device, where the activation request message includes the group identifier, and the activation request message is used to request the core network device to activate the NGAP connection configuration parameter for another terminal device (for example, a terminal device #1B below); and receiving a response sent by the core network device. The response is an acknowledgment (ACK) or a negative acknowledgment (NACK).

In an embodiment, the activation request message may further carry identification information used by the core network device to identify the another terminal device. The identification information used by the core network device to identify the terminal device may be an international mobile subscriber identity (IMSI), a system architecture evolution temporary mobile subscriber identity (S-TMSI), and other identification information related to the IMSI or the S-TMSI.

With reference to the second aspect, in an embodiment, the determining a group identifier corresponding to a terminal device includes: receiving the group identifier from the core network device.

With reference to the second aspect, in an embodiment, the method further includes: receiving the NGAP connection configuration parameter that corresponds to the group identifier and that is sent by the core network device.

With reference to the second aspect, in an embodiment, the method further includes: receiving activation indication information sent by the core network device, where the activation indication information is used to indicate to activate the NGAP connection configuration parameter for another terminal device whose group identifier is the group identifier; and activating the NGAP connection configuration parameter for the another terminal device based on the activation indication information.

With reference to the second aspect, in an embodiment, the method further includes: sending a response to the core network device. The response is an ACK or a NACK.

According to a third aspect, a communications method is provided, where the method includes: A second access network device receives a second message from a terminal device, where the second message is used by the terminal device to request to access the second access network device. The second access network device determines, based on the second message, a group identifier corresponding to the terminal device and an identifier of the terminal device, where the group identifier is used to identify a group to which the terminal device belongs, the identifier of the terminal device is used to identify the terminal device in the group to which the terminal device belongs, and the identifier of the terminal device corresponds to a dedicated context of the terminal device. The second access network device sends a third message to the first access network device, where the third message includes the group identifier and the identifier of the terminal device. The second access network device receives a third response message from the first access network device, where the third response message includes the dedicated context.

According to the communications method in an embodiment of the application, terminal devices are gathered in a group, so that a context of each terminal device may include a common context corresponding to the group and a dedicated context corresponding to the terminal device. When the second access network device needs to obtain a context of a first terminal from the first access network device, and the second access network device already stores or can determine a common context corresponding to a group to which the terminal device belongs, the second access network device may obtain only a dedicated context of the terminal device from the first access network device, but does not obtain the common context corresponding to the group to which the terminal device belongs from the first access network device. Correspondingly, the first access network device may send only the dedicated context of the terminal device to the second access network device, but does not send the common context corresponding to the group to which the terminal device belongs to the terminal device, so that signaling overheads can be reduced. Therefore, according to the method for obtaining a context of a terminal device in this application, signaling overheads for forwarding a context of a terminal device between access network devices can be reduced.

With reference to the third aspect, in an embodiment, the third response message further includes a common context corresponding to the group identifier.

For example, when the second access network device has not stored the common context corresponding to the group identifier, the second access network device may obtain the common context from the first access network device.

With reference to the third aspect, in an embodiment, the second message includes the identifier of the terminal device and the group identifier; or the second message includes the identifier of the terminal device, and the second message is carried on a physical resource corresponding to the group identifier.

Therefore, the first access network device may determine, based on the second message, the identifier of the terminal device and the group identifier.

With reference to the third aspect, in an embodiment, the second message further includes short message authentication code integrity information, for example, short message authentication code integrity (shortMAC-I) or short resume message authentication code integrity (short resumeMAC-I). The short message authentication code integrity is determined by the terminal device based on a physical cell identifier of a first serving cell, a cell identifier of a second serving cell, and the group identifier.

It should be understood that the first serving cell is served by the first access network device, and the second serving cell is served by the second access network device. It should be further understood that, in an embodiment of the application, the first access network device is a source base station, and the second access network device is a target base station. In other words, the first serving cell is a source serving cell, and the second serving cell is a target serving cell.

In an embodiment, the short message authentication code integrity information is determined based on at least the physical cell identifier (PCI) of the first serving cell, the cell identifier of the second serving cell, and a terminal identifier (for example, a cell radio network temporary identifier (C-RNTI)) of the terminal device in the first serving cell. Generally, different terminal devices have different terminal identifiers in the first serving cell. Therefore, short message authentication code integrity information used to verify the terminal devices in an access network device is also different from each other. In an embodiment, a group identifier #1 is used to replace the terminal identifier, so that short message authentication code integrity information of terminals having a same group identifier is the same, that is, the short message authentication code integrity information may be changed from being stored in a dedicated context of a terminal device to being stored in a common context of the terminal device, so that overheads for storing the dedicated context of the terminal device are further reduced.

With reference to the third aspect, in an embodiment, the third response message further includes at least one of the following: a dedicated context of another terminal device in the group corresponding to the group identifier; and attribute information of the terminal devices corresponding to the group identifier. The attribute information of the terminal devices includes at least one of the following information: quality of service attributes of services of the terminal devices, service types of the terminal devices, slice types of the terminal devices, capabilities of the terminal devices, whether the terminal devices are static, power saving requirements of the terminal devices, and latency requirements of the terminal devices.

For example, when returning a context requested by the second access network device to the second access network device, the first access network device may simultaneously return, to the second access network device, an identifier and a corresponding dedicated context of at least one other terminal device than the terminal device in the group to which the terminal device belongs. In this way, if any terminal device (for example, a terminal device #1C) that is other than the terminal device and that is in the group to which the terminal device belongs needs to access the second access network device, the second access network device does not need to send a request message to the first access network device to request a dedicated context of the terminal device #1C. Therefore, signaling overheads can be further reduced.

Alternatively, when returning a context requested by the second access network device to the second access network device, the first access network device may simultaneously return, to the second access network device, the attribute information of the terminal devices corresponding to the group corresponding to the group identifier. The second access network device can better manage, based on the group identifier and the attribute information of the terminal devices corresponding to the group identifier, each terminal device in the group corresponding to the group identifier, to help improve system performance.

With reference to the third aspect, in an embodiment, the common context includes at least one of the following information: a quality of service QoS attribute, a radio resource control (RRC) configuration, a service data adaptation protocol (SDAP) configuration, a data radio bearer (DRB) configuration, a capability of the terminal devices, and a security parameter type supported by the terminal devices.

With reference to the third aspect, in an embodiment, the third message includes indication information, where the indication information is used to indicate whether the common context corresponding to the group identifier is requested, or the indication information is used to indicate whether only the dedicated context corresponding to the identifier of the terminal device is requested, or the indication information is used to indicate whether an entire context of the terminal device is requested.

According to a fourth aspect, a communications method is provided, where the method includes: A first access network device receives a third message from a second access network device, where the third message includes a group identifier corresponding to a terminal device and an identifier of the terminal device, the group identifier is used to identify a group to which the terminal device belongs, the identifier of the terminal device is used to identify the terminal device in the group to which the terminal device belongs, and the identifier of the terminal device corresponds to a dedicated context of the terminal device. The first access network device sends a third response message, where the third response message includes the dedicated context.

According to the communications method in an embodiment of the application, terminal devices are gathered in a group, so that a context of each terminal device may include a common context corresponding to the group and a dedicated context corresponding to the terminal device. When the second access network device needs to obtain a context of a first terminal from the first access network device, and the second access network device already stores or can determine a common context corresponding to a group to which the terminal device belongs, the second access network device may obtain only a dedicated context of the terminal device from the first access network device, but does not obtain the common context corresponding to the group to which the terminal device belongs from the first access network device. Correspondingly, the first access network device may send only the dedicated context of the terminal device to the second access network device, but does not send the common context corresponding to the group to which the terminal device belongs to the terminal device, so that signaling overheads can be reduced. Therefore, according to the method for obtaining a context of a terminal device in this application, signaling overheads for forwarding a context of a terminal device between access network devices can be reduced.

With reference to the fourth aspect, in an embodiment, the third response message further includes the common context corresponding to the group identifier.

With reference to the fourth aspect, in an embodiment, the third response message further includes at least one of the following: a dedicated context of another terminal device in the group corresponding to the group identifier; and attribute information of the terminal devices corresponding to the group identifier. The attribute information of the terminal devices includes at least one of the following information: quality of service attributes of services of the terminal devices, service types of the terminal devices, slice types of the terminal devices, capabilities of the terminal devices, whether the terminal devices are static, power saving requirements of the terminal devices, and latency requirements of the terminal devices.

With reference to the fourth aspect, in an embodiment, the common context includes at least one of the following information: a quality of service (QoS) attribute, a radio resource control (RRC) configuration, a service data adaptation protocol (SDAP) configuration, a data radio bearer (DRB) configuration, a capability of the terminal devices, and a security parameter type supported by the terminal devices.

With reference to the fourth aspect, in an embodiment, the third message includes indication information, where the indication information is used to indicate whether the common context corresponding to the group identifier is requested, or the indication information is used to indicate whether only the dedicated context corresponding to the identifier of the terminal device is requested, or the indication information is used to indicate whether an entire context of the terminal device is requested.

According to a fifth aspect, a communications method is provided, where the method includes: determining a group identifier of a terminal device and an NGAP connection configuration parameter corresponding to the group identifier; and sending the NGAP connection configuration parameter to the first access network device.

For details of the group identifier, refer to the foregoing description of the group identifier. Details are not described herein again.

With reference to the fifth aspect, in an embodiment, the determining a group identifier of a terminal device includes: receiving a fourth message from the first access network device, where the fourth message includes the group identifier of the terminal device, and the fourth message is used to request the core network device to configure the NGAP connection configuration parameter corresponding to the group identifier.

With reference to the fifth aspect, in an embodiment, the method further includes: receiving an activation request message from the first access network device, where the activation request message includes the group identifier, and the activation request message is used to request the core network device to activate the NGAP connection configuration parameter for another terminal device (for example, a terminal device #1B below); and receiving a response sent by the core network device. The response is an ACK or a NACK.

In an embodiment, the activation request message may further carry identification information used by the core network device to identify the another terminal device. The identification information used by the core network device to identify the terminal device may be an international mobile subscriber identity (IMSI), a system architecture evolution temporary mobile subscriber identity (S-TMSI), and other identification information related to the IMSI or the S-TMSI.

With reference to the fifth aspect, in an embodiment, the method further includes: sending activation indication information to the first access network device, where the activation indication information is used to indicate the first access network device to activate the NGAP connection configuration parameter for another terminal device whose group identifier is the group identifier.

With reference to the fifth aspect, in an embodiment, the method further includes: receiving a response from the first access network device. The response is an acknowledgment message, a failure message, or a reject message.

According to a sixth aspect, a communications apparatus is provided, where the apparatus includes units or modules configured to perform the method according to any one of the first aspect or other embodiments of the first aspect.

In an embodiment, the communications apparatus in the sixth aspect may be a terminal device, or may be a component (for example, a chip or a circuit) that can be used in a terminal device.

According to a seventh aspect, an embodiment of this application provides a communications apparatus, where the apparatus includes units or modules configured to perform the method according to any one of the second aspect or other embodiments of the second aspect.

In an embodiment, the communications apparatus in the seventh aspect may be an access network device, or may be a component (for example, a chip or a circuit) that can be used in an access network device.

According to an eighth aspect, an embodiment of this application provides a communications apparatus, where the apparatus includes units or modules configured to perform the method according to any one of the third aspect or other embodiments of the third aspect.

In an embodiment, the communications apparatus in the eighth aspect may be the second access network device in the foregoing method embodiments, or may be a component (for example, a chip or a circuit) that can be used in the second access network device.

According to a ninth aspect, an embodiment of this application provides a communications apparatus, where the apparatus includes units or modules configured to perform the method according to any one of the fourth aspect or other embodiments of the fourth aspect.

In an embodiment, the communications apparatus in the ninth aspect may be the first access network device provided in the fourth aspect, or may be a component (for example, a chip or a circuit) that can be used in the first access network device.

According to a tenth aspect, an embodiment of this application provides a communications apparatus, where the apparatus includes units or modules configured to perform the method according to any one of the fifth aspect or other embodiments of the fifth aspect.

In an embodiment, the communications apparatus in the tenth aspect may be the core network device in the foregoing method embodiments, or may be a component (for example, a chip or a circuit) that can be used in the core network device.

According to an eleventh aspect, a communications apparatus is provided, where the device includes a processor and a memory, where the memory is configured to store a computer program, and the processor is configured to invoke the computer program from the memory and run the computer program, so that the apparatus is enabled to perform the method according to any one of the first aspect to the fifth aspect or other embodiments of the first aspect to the fifth aspect.

In an embodiment, there are one or more processors, and there are one or more memories.

In an embodiment, the memory may be integrated with the processor, or the memory and the processor are disposed separately.

In an embodiment, the communications apparatus further includes a transceiver or a transceiver circuit, configured to achieve information receiving and sending functions.

According to a twelfth aspect, this application provides a computer-readable storage medium, where the computer-readable storage medium stores a computer program, and when the computer program is executed, the method according to any one of the first aspect to the fifth aspect or other embodiments of the first aspect to the fifth aspect is implemented.

According to a thirteenth aspect, this application provides a computer program product including a computer program, and when the computer program is run, the method according to any one of the first aspect to the fifth aspect or other embodiments of the first aspect to the fifth aspect is implemented.

According to a fourteenth aspect, this application provides a chip system, where the chip system includes an input/output interface and at least one processor, and the at least one processor is configured to invoke an instruction in a memory, to perform an operation of the method according to any one of the first aspect to the fifth aspect or other embodiments of the first aspect to the fifth aspect.

In an embodiment, the chip system may further include at least one memory and a bus, and the at least one memory is configured to store the instruction executed by the processor.

In an embodiment, the input/output interface is implemented in a form of an interface circuit.

DESCRIPTION OF EMBODIMENTS

Technical solutions in embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5th generation (5G) system or new radio (NR) system.

Figure 1:
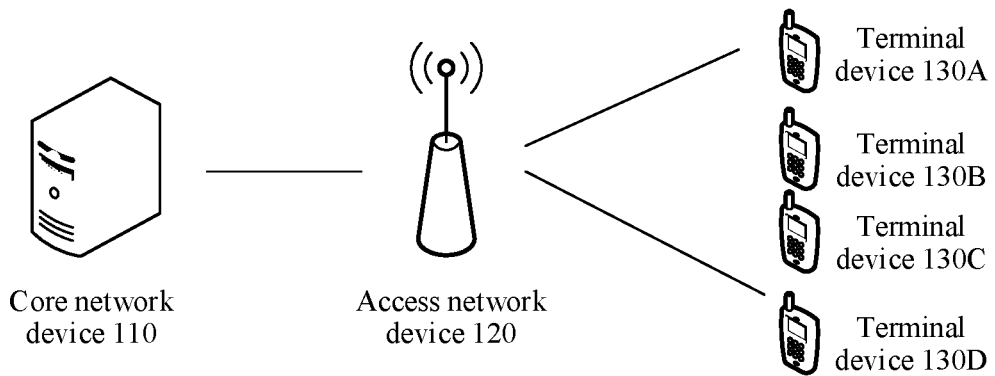
FIG. 1 is a schematic diagram of a communications system applied to this application.

FIG. 1 is a schematic diagram of an architecture of a mobile communications system applied to an embodiment of this application. As shown in FIG. 1, the mobile communications system includes a core network device 110, an access network device 120, and terminal devices 130A to 130D. The terminal devices 130A to 130D have a same characteristic. For example, all the terminal devices 130A to 130D belong to a smart home or a smart street lamp.

The terminal devices may be user equipment, access terminals, subscriber units, subscriber stations, mobile stations, mobile consoles, remote stations, remote terminals, mobile devices, user terminals, terminals, wireless communications devices, user agents, or user apparatuses. The terminal devices may alternatively be cellular phones, cordless phones, session initiation protocol (SIP) phones, wireless local loop (WLL) stations, personal digital assistants (PDA), handheld devices having a wireless communication function, computing devices, other processing devices connected to a wireless modem, vehicle-mounted devices, wearable devices, terminal devices in a 5G network, terminal devices in a future evolved public land mobile network (PLMN), or the like. This is not limited in an embodiment of the application.

The access network device may be a base transceiver station (base transceiver station, BTS) in the global system for mobile communications (GSM) system or code division multiple access (CDMA) system, or may be a NodeB (NB) in the wideband code division multiple access (WCDMA) system, or may be an evolved NodeB eNB or eNodeB) in the LTE system, or may be a radio controller in a cloud radio access network (CRAN) scenario. Alternatively, the network device may be a relay station, an access point, a vehicle-mounted device, a wearable device, a network device in the 5G network, a network device in the future evolved PLMN network, or the like. This is not limited in an embodiment of the application.

The core network device may be a mobility management entity (MME), or a core network access and mobility management function (AMF), or may be another device responsible for access management and mobility management of a terminal device. This is not limited in an embodiment of the application.

Referring to FIG. 1, the access network device 120 is connected to the core network device 110 in a wireless or wired manner. The core network device 110 and the access network device 120 may be different independent physical devices, or a function of the core network device 110 and a logical function of the access network device may be integrated into one physical device, or a part of a function of the core network device 110 and a part of a function of the access network device 120 may be integrated into one physical device.

The terminal devices 130A to 130D are separately connected to the access network device 120 in a wireless manner. Although the terminal devices 130A to 130D have a same attribute, and contexts of the terminal devices 130A to 130D may include same content, based on a conventional technology, the access network device 120 still needs to store a context of each of the terminal devices 130A to 130D. Consequently, a relatively large quantity of storage resources are consumed, and performance of the access network device is reduced. In an embodiment, the context herein may include configuration information of the terminal device in a network and/or capability information of the terminal device. The content of the context is not limited in an embodiment of the application.

To resolve the foregoing problem, this application provides a method for obtaining a context of a terminal device, to reduce storage resources required by an access network device to store a context of a terminal device.

In an embodiment, in a communications method provided in an embodiment of the application, terminal devices that have same attribute information are gathered in a group, so that a context of each terminal device is divided into two parts: a common context and a dedicated context, where the common context is shared by all the terminal devices in the group, and the dedicated context is a context to the terminal device. An access network device stores one common context for each group and stores a dedicated context of each terminal device in the group, to maintain the context of each terminal device. Because the access network device does not need to repeatedly store a same part of contexts of the plurality of terminal devices that have a same attribute, storage resources required by the access network device to store the contexts of the terminal devices can be reduced. The following describes this application in detail.

In an embodiment, the attribute information may be quality of service (QoS) attributes, service types of the terminal devices, slice types of the terminal devices, capabilities of the terminal devices, whether the terminal devices are static, power saving requirements of the terminal devices, and latency requirements of the terminal devices. It should be understood that the attribute information of the terminal devices listed herein is merely an example for description, and shall not constitute any limitation on this application. In an embodiment, the attribute information of the terminal devices may alternatively be other information. Further, the QoS attribute may include, for example, one or more of the following: a priority level, packet delay budget, a packet error ratio, a delay-sensitive indication, an averaging window, and a maximum data burst volume. Content included in the QoS attribute is not limited in this application either.

It may be understood that, for example, terminal devices belonging to a same group may be terminal devices having a same QoS attribute. Alternatively, terminal devices belonging to a same group may have a same service type and a same slice type. Alternatively, terminal devices belonging to a same group have a same power saving requirement and a same latency requirement.

It should be understood that in the embodiments of this application, the terminal device and/or the network device (the access network device or the core network device) may perform some or all of the operations in the embodiments of this application. These operations or operations are merely examples. In the embodiments of this application, other operations or variations of various operations may be further performed. In addition, the operations may be performed in different sequences presented in the embodiments of this application, and not all the operations in the embodiments of this application may be performed.

Figure 2:
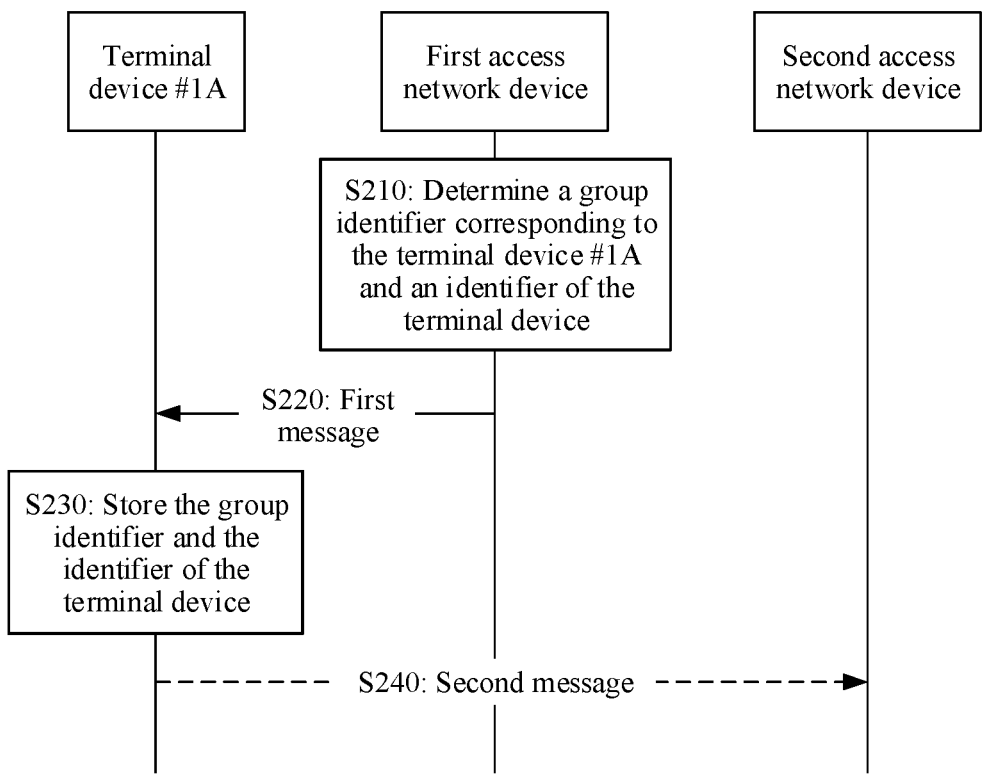
FIG. 2 is a schematic flowchart of a communications method according to an embodiment of the application.

FIG. 2 is a schematic flowchart of a communications method 200 according to an embodiment of this application. The method 200 may be used in the communications system 100 shown in FIG. 1. However, an embodiment of the application is not limited thereto.

S210: A first access network device determines a group identifier corresponding to a terminal device #1A and an identifier of the terminal device.

It should be understood that the first access network device may be an access network device accessed by the terminal device #1A when accessing a network for the first time. However, this is not limited in an embodiment of the application. For example, the first access network device may alternatively be any access network device that provides a service for the terminal device #1A.

S220: The first access network device sends a first message to the terminal device #1A, where the first message includes the group identifier and the identifier of the terminal device.

S230: The terminal device #1A stores the group identifier and the identifier of the terminal device.

The group identifier is used to identify a group to which the terminal device belongs, and the identifier of the terminal device is used to identify the terminal device in the group to which the terminal device belongs. The group identifier corresponds to a common context, and the identifier of the terminal device corresponds to a dedicated context of the terminal device #1A. In an embodiment, one group identifier is associated with one common context, and an identifier of one terminal device is associated with one dedicated context. The common context and the dedicated context constitute a context of the terminal device #1A, namely, an entire context of the terminal device #1A. In addition, the common context is shared by all terminal devices in the group, and the dedicated context is a context dedicated to the terminal device #1A.

In an embodiment, a context of any terminal device that belongs to the same group includes the common context corresponding to the group identifier that identifies the group and a dedicated context of the terminal device.

In an embodiment, in a process of establishing a connection to the terminal device #1A, the first access network device may determine the group identifier corresponding to the terminal device #1A and the identifier of the terminal device, and may allocate the common context corresponding to the group identifier and the dedicated context corresponding to the identifier of the terminal device to the terminal device #1A. In a process in which the first access network device configures the terminal device #1A to enter a non-connected state, the first access network device may send the group identifier and the identifier of the terminal device to the terminal device #1A through the first message. After receiving the group identifier and the identifier of the terminal device that are allocated by the first access network device, the terminal device #1A may store the group identifier and the identifier of the terminal device. When the terminal device needs to access the network again, the terminal device may access the network based on the group identifier and the identifier of the terminal device.

Therefore, in an embodiment of the application, terminal devices are gathered in a group, so that a context of each terminal device includes a common context corresponding to a group identifier and a dedicated context corresponding to an identifier of the terminal device. All terminal devices in each group share a same common context, and each terminal device uses a dedicated context. In this way, when maintaining contexts of the terminal devices, the access network device does not need to store the entire context of each terminal device, so that resource requirements of the access network device on maintaining contexts can be reduced. For example, if the terminal device is the first terminal device in the group that accesses the first access network device, the first access network device may configure and store the common context corresponding to the group to which the terminal device belongs and the dedicated context corresponding to the terminal device. If a context needs to be subsequently configured for another terminal device that belongs to the group, the first access network device needs to configure and store only a dedicated context of the another terminal device. If the first access network device already stores, before configuring a context of the terminal device, the common context corresponding to the group corresponding to the terminal device, the first access network device does not need to store a common context corresponding to the terminal device.

In the following, for ease of understanding and description, the group identifier corresponding to the terminal device #1A is denoted as a group identifier #1, and the identifier of the terminal device #1A is denoted as an identifier #A, to describe an embodiment of the application in detail. It should be understood that the terminal device #1A may be any terminal device. It may be understood that the group identifier and the identifier of the terminal device may be represented in different forms. This is not limited in an embodiment of the application.

The following first describes, by using examples, two manners in which the first access network device determines the group identifier corresponding to the terminal device #1A.

Manner 1:

The first access network device may determine, based on a preset rule or an independently determined grouping rule, the group identifier corresponding to the terminal device #1A. The preset rule may be determined by several network devices (for example, the network devices may include an access network device and/or a core network device) through negotiation, or may be determined by a core network device and then sent to the first access network device, or may be configured by an operation, administration and maintenance (OAM) entity, or may be specified in a protocol. This is not limited in an embodiment of the application. For example, the preset rule may define a correspondence between the group identifier and attribute information of the terminal devices. For example, if that the group identifier #1 corresponds to attribute information A that satisfies a first condition, and that a group identifier #2 corresponds to attribute information A that satisfies a second condition are defined in the preset rule or the grouping rule, when attribute information A of a terminal device satisfies the first condition, the first access network device determines a group identifier of the terminal device as the group identifier #1, or when attribute information A of a terminal device satisfies the second condition, the first access network device determines a group identifier of the terminal device as the group identifier #2.

In an embodiment, the attribute information of the terminal devices includes one or more of the following information: QoS attributes of the terminal devices, service types of the terminal devices, slice types of the terminal devices, capabilities of the terminal devices, whether the terminal devices are static, power saving requirements of the terminal devices, and latency requirements of the terminal devices. It should be understood that the attribute information of the terminal devices listed herein is merely an example for description, and shall not constitute any limitation on this application. In an embodiment, the attribute information of the terminal devices may alternatively be other information. Further, the QoS attribute may include, for example, one or more of the following: a priority level, packet delay budget, a packet error ratio, a delay-sensitive indication, an averaging window, and a maximum data burst volume. Content included in the QoS attribute is not limited in this application either. In this application, the attribute information of the terminal device #1A may be sent by the terminal device #1A to the first access network device, or may be obtained by the first access network device from the core network device (for example, a first core network device). How the first access network device obtains attribute information of the terminal device #1A is not limited in this application.

To make one of ordinary skilled in the art better understand this application, the following describes, by using an example in which a correspondence between a latency requirement of a terminal device and a group identifier is defined in the preset rule and with reference to Table 1, how the first access network device independently determines, according to the preset rule, the group identifier corresponding to the terminal device #1A.

TABLE 1

| Group identifier | Latency requirement (ms) |
|---|---|
| Group identifier #1 | ≤2 |
| Group identifier #2 | >2, and ≤4 |
| Group identifier #3 | >4, and ≤5 |
| ... | ... |

As shown in Table 1, a group identifier of a terminal device whose latency requirement is less than or equal to 2 ms may be determined as the group identifier #1, a group identifier of a terminal device whose latency requirement is greater than 2 ms and less than or equal to 4 ms may be determined as the group identifier #2, and a group identifier of a terminal device whose latency requirement is greater than 4 ms and less than or equal to 5 ms may be determined as the group identifier #3. In an embodiment of the application, it is assumed that a latency requirement of the terminal device #1A is less than or equal to 2 ms. Therefore, the group identifier of the terminal device #1A is configured to be the group identifier #1.

Manner 2:

The first access network device obtains the group identifier that corresponds to the terminal device #1A and that is sent by the core network device. For example, when the terminal device #1A requests to access the network, the first access network device may send attribute information of the terminal device #1A to the core network device, and the core network device determines the group identifier corresponding to the terminal device #1A based on the attribute information of the terminal device #1A. The core network device then sends the determined group identifier to the first access network device, and the first access network device determines the received group identifier as the group identifier corresponding to the terminal device #1A. Similar to Manner 1, the core network device may determine the group identifier of the terminal device #1A according to a preset rule. For details, refer to the description of Manner 1. Details are not described herein again.

Further, after the first access network device determines the group identifier #1 and the identifier #A, the first access network device may determine the common context corresponding to the group identifier #1 and the dedicated context corresponding to the identifier #A.

In an embodiment, a common context corresponding to a group identifier may be predefined or preconfigured. For example, the first access network device may pre-store a common context corresponding to each group identifier. When the first access network device determines that the group identifier of the terminal device #1A is #1, the first access network device may determine the common context of the terminal device #1A based on a stored common context corresponding to the group identifier #1.

In an embodiment, when the first terminal device whose group identifier is configured to be the group identifier #1 accesses the first access network device, the first access network device may configure and store the common context corresponding to the group identifier #1. For example, the common context corresponding to the group identifier #1 may be configured by the first access network device based on attribute information and/or other information of terminal devices corresponding to the group identifier #1 when the first terminal device whose group identifier is configured to be the group identifier #1 accesses the first access network device. In other words, if the terminal device #1A is the first terminal device whose group identifier is configured to be the group identifier #1, when the terminal device #1A accesses the first access network device, the first access network device needs to configure and store the common context corresponding to the group identifier #1; or if the terminal device #1A is not the first terminal device whose group identifier is configured to be the group identifier #1, it indicates that the first access network device already stores the common context corresponding to the group identifier #1, and the first access network device does not need to repeatedly configure or store the common context corresponding to the group identifier #1.

It should be noted that, a manner used by the first access network device to configure a common context may be that the first access network device independently configures the common context, that the first access network device obtains a common context configured by the core network device, or that the first access network device configures the common context specified in a protocol. This is not limited in an embodiment of the application.

It should be understood that a group identifier may be used to identify one group in a specific area. The specific area may be preconfigured, for example, preconfigured by an operation, administration and maintenance (OAM) entity. Alternatively, the specific area may be specified in a protocol. Alternatively, the specific area may be determined through interaction between the first access network device and another access network device. In a scenario in which a group identifier identifies one group in a specific area, common contexts corresponding to group identifiers may be preconfigured for network devices (for example, access network devices and/or core network devices) in the specific area. In this case, if two terminal devices that have a same group identifier but different identifiers of the terminal devices separately access two access network devices in the specific area, common contexts that are of the two terminal devices and that are determined by the two access network devices are the same.

In addition, in a scenario in which a group identifier identifies one group in a specific area, if a common context is configured by a core network device in the specific area, similarly, if two terminal devices that have a same group identifier but different identifiers of the terminal devices separately access different access network devices in the specific area that belong to a same core network device, common contexts that are of the two terminal devices and that are determined by the two access network devices are the same.

In an embodiment, the common context may include one or more of the following information: a QoS attribute, an RRC configuration, an SDAP configuration, a DRB configuration, a capability of the terminal devices, and a security parameter type supported by the terminal devices. In other words, for a group, one or more of QoS attributes, RRC configurations, SDAP configurations, DRB configurations, capabilities of the terminal devices, and security parameter types supported by the terminal devices of all terminal devices in the group are the same.

In an embodiment, a dedicated context may include a security parameter. For example, the dedicated context of the terminal device #1A may include a security parameter of the terminal device #1A. The security parameter includes at least one of an integrity protection algorithm, an encryption algorithm, and a security key parameter. The security key parameter may be at least one of a key KgNB, a key next hop (NH), and a next hop chaining count (NCC). The security key parameter may further include a signaling plane and/or user plane security key used for integrity protection and/or encryption. It should be understood that the dedicated context may alternatively be other information, or the dedicated context may further include other information in addition to the security parameter. This is not limited in an embodiment of the application. For example, the SDAP configuration information is not stored in the common context, but the SDAP configuration information is stored in the dedicated context. Alternatively, one part of the SDAP configuration information may be stored in the common context, and the other part may be stored in the dedicated context.

Generally, common contexts corresponding to different group identifiers are different. However, in this application, a possibility that different group identifiers correspond to a same common context is not excluded. Similarly, in general cases, dedicated contexts corresponding to terminal devices are different. For example, dedicated contexts corresponding to terminal devices in a group corresponding to an identifier #1 are different. However, in this application, a possibility that a plurality of terminal devices in a same group correspond to a same dedicated context is not excluded.

In an embodiment, in an embodiment of this application, after determining the common context corresponding to the group identifier #1, the first access network device may further send the common context to the terminal device #1A.

For example, when the common context is independently configured by the first access network device, or is configured by the core network device, the first access network device may send the common context corresponding to the group identifier #1 to the terminal device #1A. It should be noted that, in this case, the terminal device #1A may not distinguish which information is the group identifier and which information is the identifier of the terminal device in information sent by the first access network device. For example, a length of the group identifier #1 is five bits (bit), and a length of the identifier #A is four bits. When the first access network device sends identification information of nine bits to the terminal device #1A, the terminal device #1A does not need to distinguish between bits that are of the group identifier and bits that are of the identifier of the terminal device in the 9 bits. Further, the terminal device may not distinguish which context is a common context and which context is a dedicated context.

In addition, the first access network device may alternatively not send the common context to the terminal device #1A. For example, the common context corresponding to the group identifier may be preconfigured for the terminal device. In this case, the terminal device #1A may determine the corresponding common context based on the group identifier #1 sent by the first access network device. It should be noted that, in this case, the terminal device #1A needs to distinguish which information is the group identifier and which context is the common context in identification information sent by the first access network device.

In an embodiment, in an embodiment of this application, after determining the dedicated context, the first access network device may further send the dedicated context to the terminal device #1A.

In an embodiment, in an embodiment of this application, after the terminal device #1A receives the first message and enters an inactive state, if the terminal device #1A accesses the first access network device again, the first access network device may reallocate an identifier of the terminal device to the terminal device #1A. It should be understood that the first access network device may alternatively reallocate a group identifier to the terminal device #1A. However, this is not limited in an embodiment of the application.

In an embodiment, the method may further include the following operation:

S240: The terminal device #1A sends a second message to a second access network device.

In an embodiment, the second message may be used to request to access the second access network device. For example, when the terminal device #1A is in the inactive state, if the terminal device #1A moves to a second serving cell covered by the second access network device, the terminal device #1A may send the second message to the second access network device, to request to access the second access network device. The second message may be, for example, a random access request message, an RRC connection request message, or a RRC resume request message. This is not limited in this application.

It should be understood that the inactive state may be an RRC inactive state, a light RRC connection state, or an enhanced idle state.

In an embodiment, when a terminal device is in an inactive state, although the access network device releases an RRC connection of the terminal device, the terminal device and the access network device store a context of the terminal device. The terminal device and the core network device store a non-access stratum context of the terminal device. In an embodiment, the access network device and the core network device may further maintain a connection of the terminal device to the access network device and a connection of the terminal device to the core network device.

The second message may be used by the second access network device to determine the group identifier #1 and the identifier #A. For example, the second message may include the identifier of the terminal device #1A, namely, the identifier #A. Further, the second message may further include the group identifier #1. Alternatively, the second message may be carried on a physical resource corresponding to the group identifier #1, and the second access network device may determine, based on the physical resource for sending the second message, that the group identifier corresponding to the terminal device #1A is the group identifier #1. For example, if the second access network device broadcasts or preconfigures a mapping relationship: {[Group identifier #1, Physical resource #1]; [Group identifier #2, Physical resource #2] . . . }, and if the terminal device #1A sends the second message on the physical resource #1, the second access network device may determine that the terminal device #1A corresponds to the group identifier #1. The physical resource may be a physical random access channel (PRACH) resource, and includes, for example, a physical random access preamble and/or a physical random access time/frequency domain resource. However, this is not limited in this application.

It should be understood that, after receiving the second message, the second access network device responds to the terminal device #1A based on a conventional technology. For example, the second access network device may configure the terminal device #1A to enter an idle state, the inactive state, or an active state. For a response procedure, refer to the conventional technology. Details are not described herein.

In an embodiment, in an embodiment of this application, the second message may further include short message authentication code integrity information, for example, may be the shortMAC-I or short resumeMAC-I. The short message authentication code integrity information is determined by the terminal device #1A based on a physical cell identifier (PCI) of a first serving cell, a cell identifier of the second serving cell, and the group identifier #1.

It should be understood that, in an embodiment of the application, the first serving cell is a cell covered by the first access network device, and the second serving cell is a cell covered by the second access network device. The first serving cell may be a source serving cell, and correspondingly, the second serving cell may be a target cell or a new serving cell.

Figure 3:
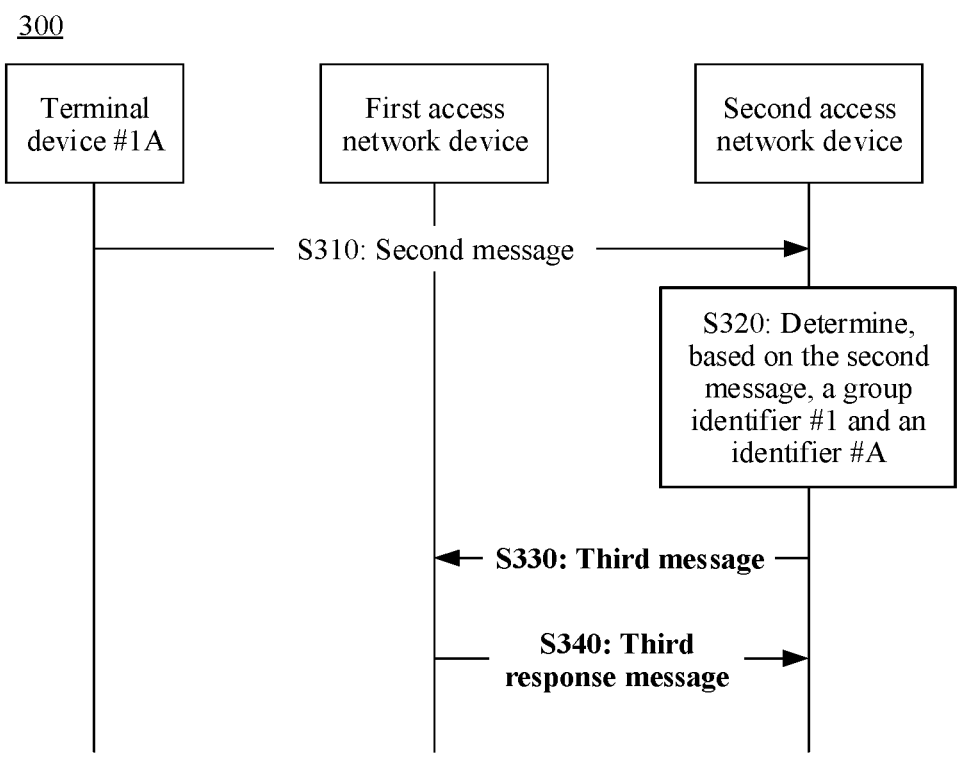
FIG. 3 is a schematic flowchart of another communications method according to an embodiment of the application.

After the terminal device #1A sends the second message, the second access network device may obtain the context of the terminal device #1A by using a method 300 shown in FIG. 3, to connect the terminal device #1A to the second access network device. This is described in detail below.

FIG. 3 is a schematic flowchart of the communications method 300 according to an embodiment of this application. The method 300 may be used in a scenario in which a terminal device #1A is handed over from a first access network device to a second access network device. However, an embodiment of the application is not limited to this application scenario. It should be noted that, for concepts, words, or terms that appear below and that are the same as those described above, refer to the foregoing explanations and descriptions. Details are not described below again. For example, the first access network device in the method 300 is the first access network device in the method 200.

S310: The second access network device receives a second message from the terminal device #1A.

The second message may be used by the terminal device #1A to request to access the second access network device. For details, refer to the foregoing description of the second message. Details are not described herein again.

S320: The second access network device determines, based on the second message, a group identifier corresponding to the terminal device #1A and an identifier of the terminal device #1A, that is, the second access network device determines a group identifier #1 and an identifier #A.

For example, the second message may include the group identifier #1 and the identifier #A. For another example, the second message may include the identifier #A. The second message may be carried on a physical resource corresponding to the group identifier #1, and the second access network device may determine, based on the physical resource for sending the second message, that the group identifier corresponding to the terminal device #1A is the group identifier #1.

It should be understood that the second access network device may learn, based on the second message, that a context of the terminal device needs to be obtained from the first access network device. For example, the second message may include identification information used to indicate the first access network device.

S330: The second access network device sends a third message to the first access network device.

Correspondingly, the first access network device receives the third message from the second access network device.

The third message may include the group identifier #1 and the identifier #A, and the third message may be used to request a dedicated context corresponding to the identifier #A.

In an embodiment, in an embodiment of this application, the third message may further be used to request a common context corresponding to the group identifier #1. Correspondingly, the third message may further include the common context corresponding to the group identifier #1.

In an embodiment of the third message, the third message may include indication information, where the indication information may be used to indicate whether the common context corresponding to the group identifier #1 is requested, or the indication information is used to indicate whether only the dedicated context corresponding to the identifier #A is requested, or the indication information is used to indicate whether the entire context of the terminal device #1A is requested. The entire context represents the common context and the dedicated context that correspond to the terminal device #1A. In an embodiment, the case in which the indication information may be used to indicate whether the common context corresponding to the group identifier #1 is requested may be understood as that it is implicitly, or by default, indicated that the dedicated context corresponding to the identifier #A needs to be requested. In other words, it is not separately indicated that the dedicated context corresponding to the identifier #A is requested. When the indication information can be used to indicate that the common context corresponding to the group identifier #1 is requested, it indicates that the common context and the dedicated context corresponding to the identifier #A are requested. When the indication information indicates that the common context corresponding to the group identifier #1 is not requested, it indicates that only the dedicated context corresponding to the identifier #A is requested. In conclusion, the first access network device can determine, based on the indication information, a type of the context requested by the second access network device, that is, only the dedicated context is requested, or the common context and the dedicated context are requested.

For example, the indication information may be information of one bit. For example, when a value of the bit is TRUE or 1, the bit is used to indicate that the third message is used to request the dedicated context corresponding to the identifier #A and the common context corresponding to the group identifier #1. When a value of the bit is FALSE or 0, the bit is used to indicate that the third message is used to request only the common context corresponding to the group identifier #1.

For example, if the second access network device already stores the common context corresponding to the group identifier #1, the second access network device may request only the dedicated context corresponding to the identifier #A. For example, before the second access network device obtains the group identifier #1 sent by the terminal device #1A, another terminal device (for example, a terminal device #1B) in a group to which the terminal device #1A belongs needs to access the second access network device, and the second access network device already obtains, from the first access network device, and stores the common context corresponding to the group identifier #1. In this case, the second access network device does not need to obtain the common context corresponding to the group identifier #1 from the first access network device again, but needs to obtain only the dedicated context corresponding to the identifier #A. For another example, the second access network device may determine, based on the group identifier #1, the common context corresponding to the group identifier #1 in the common context pre-stored in the second access network device, and does not need to obtain the common context corresponding to the group identifier #1 from the first access network device.

For example, if the second access network device determines that the second access network device has not stored or cannot determine the common context corresponding to the group identifier #1, the second access network device may request the common context corresponding to the group identifier #1 from the first access network device. It should be understood that, when determining that the second access network device stores the common context corresponding to the group identifier #1, the second access network device may also request the common context corresponding to the group identifier #1. This is not limited in this application.

S340: The first access network device sends a third response message to the second access network device.

Correspondingly, the second access network device receives the third response message from the first access network device. The third response message includes the dedicated context corresponding to the identifier #A.

In an embodiment, after the first access network device sends the third response message to the second access network device, the first access network device may delete the dedicated context corresponding to the identifier #A. Further, the first access network device may also delete the common context corresponding to the group identifier #1.

In conclusion, in an embodiment of the application, terminal devices are gathered in a group, and a context of each terminal device includes a common context corresponding to the group and a dedicated context corresponding to the terminal device. When the second access network device needs to obtain a context of a first terminal from the first access network device, and the second access network device already stores or can determine a common context corresponding to a group to which the terminal device belongs, the second access network device may obtain only a dedicated context of the terminal device from the first access network device, but does not obtain the common context corresponding to the group to which the terminal device belongs from the first access network device. Correspondingly, the first access network device may send only the dedicated context of the terminal device to the second access network device, but does not send the common context corresponding to the group to which the terminal device belongs to the terminal device, so that signaling overheads can be reduced.

Therefore, according to the method for obtaining a context of a terminal device in this application, signaling overheads for forwarding a context of a terminal device between access network devices can be reduced.

In an embodiment, in an embodiment of this application, the third message may further include short message authentication code integrity information, for example, may be the shortMAC-I or short resumeMAC-I. The short message authentication code integrity information is determined by the terminal device #1A based on the physical cell identifier PCI of the first serving cell, the cell identifier of the second serving cell, and the group identifier #1.

It should be understood that, in an embodiment of the application, the first serving cell is a cell covered by the first access network device, and the second serving cell is a cell covered by the second access network device. The first serving cell is a source serving cell, and correspondingly, the second serving cell is a target cell or a new serving cell.

In an embodiment, in an embodiment of this application, the third response message further includes (1) or (2) described below, or may include both (1) and (2).

(1) A Dedicated Context of Another Terminal Device in the Group Corresponding to the Group Identifier #1.

When returning a context requested by the second access network device to the second access network device, the first access network device may simultaneously return, to the second access network device, an identifier and a corresponding dedicated context of at least one other terminal device than the terminal device #1A in the group to which the terminal device #1A belongs. In this way, if any terminal device (for example, a terminal device #1C) that is other than the terminal device #1A and that is in the group to which the terminal device #1A belongs needs to access the second access network device, the second access network device does not need to send a request message to the first access network device to request a dedicated context of the terminal device #1C. Therefore, signaling overheads can be further reduced.

(2) Attribute Information of Terminal Devices Corresponding to the Group Corresponding to the Group Identifier #1, or Attribute Information of Terminal Devices Corresponding to the Group Identifier #1, or Common Attribute Information of all Terminal Devices Corresponding to the Group Identifier #1.

For example, the attribute information of the terminal devices corresponding to the group identifier #1 may include a power saving requirement. It should be understood that an attribute of each terminal device corresponding to the group identifier #1 includes a power saving requirement. In other words, the first access network device configures a group identifier of a terminal device having a power saving requirement to be the group identifier #1.

In operation S340, when returning the context requested by the second access network device to the second access network device, the first access network device may simultaneously return, to the second access network device, the attribute information of the terminal devices corresponding to the group corresponding to the group identifier #1. The second access network device can better manage, based on the group identifier #1 and the attribute information of the terminal devices corresponding to the group identifier #1, each terminal device in the group corresponding to the group identifier #1, to help improve system performance.

Figure 4:
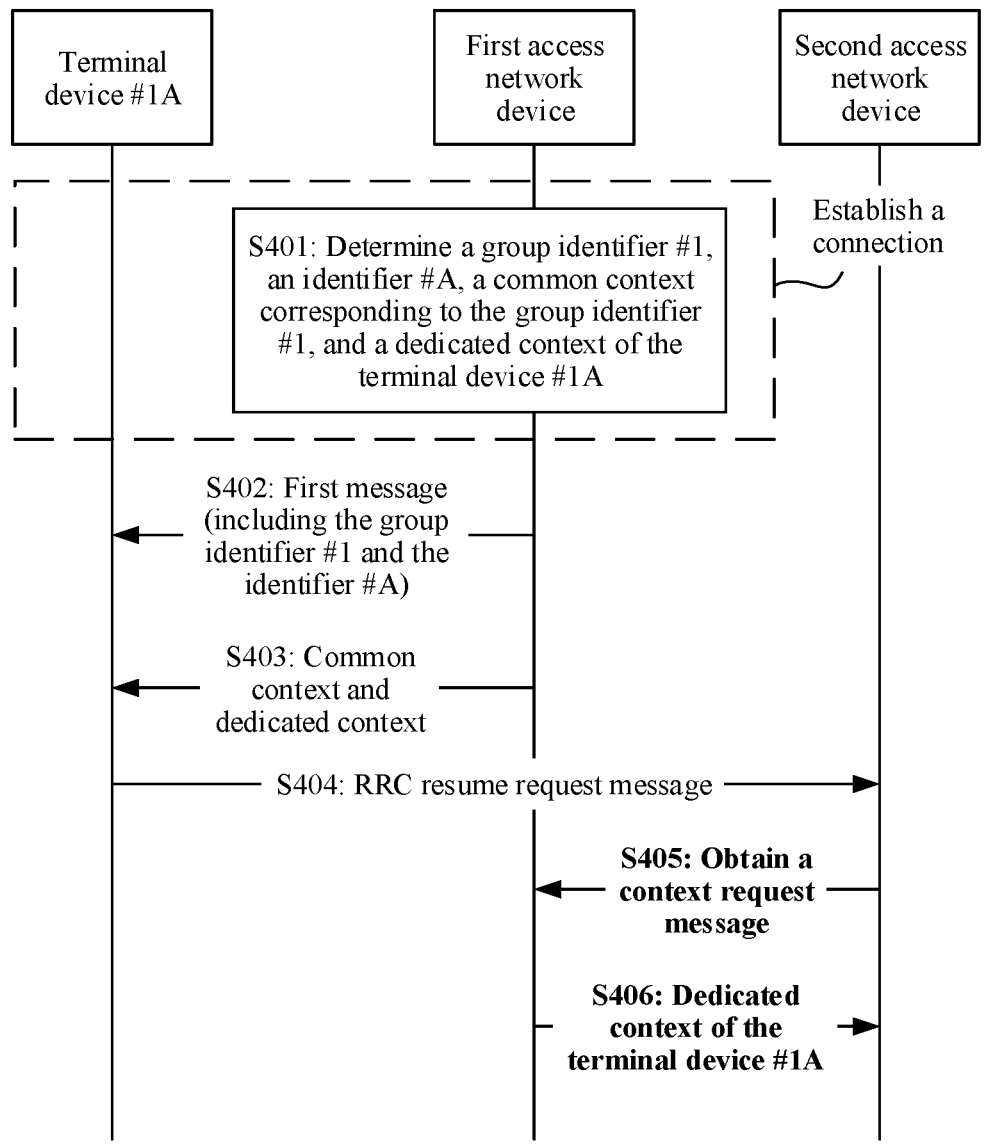
FIG. 4 is a schematic flowchart of an embodiment of a communications method according to an embodiment of the application.

To make one of ordinary skilled in the art better understand this application, the following describes in detail the method in this application with reference to a method 400 for obtaining a context of a terminal device shown in FIG. 4.

FIG. 4 shows an example of a method for obtaining a context of a terminal device according to an embodiment of the application.

S401: In a process in which the terminal device #1A establishes a connection to the first access network device, the first access network device determines the group identifier #1 and the identifier #A, and determines the common context corresponding to the group identifier #1 and the dedicated context corresponding to the identifier #A.

In an embodiment, the first access network device may receive the attribute information sent by the terminal device #1A, or receive the attribute information of the terminal device #1A sent by the core network device, and determine the group identifier #1 and the identifier #A based on the attribute information of the terminal device #1A.

For how the first access network device determines the common context corresponding to the group identifier #1 and the dedicated context corresponding to the identifier #A, refer to the foregoing description. Details are not described herein again. S402: The first access network device sends the first message to the terminal device #1A.

The first message includes the group identifier #1 and the identifier #A. For example, when configuring the terminal device to enter the non-connected state, for example, the idle state, the inactive state, or another non-connected state, the first access network device may send the group identifier #1 and the identifier #A to the terminal device #1A.

S403: The first access network device sends the common context and the dedicated context to the terminal device #1A.

It may be understood that messages for sending the common context and the dedicated context that are sent by the first access network device to the terminal device #1A may be the same, or may be different.

S404: The terminal device #1A sends an RRC resume request message (that is, an example of the second message) to the second access network device, where the RRC resume request message includes the group identifier #1 and the identifier #A.

In an embodiment, the RRC resume request message may further include short message authentication code integrity information, for example, may be shortMAC-I or short resumeMAC-I.

S405: The second access network device sends a context obtaining request message (that is, an example of the third message) to the first access network device, where the context obtaining request message includes the group identifier #1 and the identifier #A.

The context obtaining request message may include the indication information. The indication information may be used to indicate whether the common context is requested; or the indication information may be used to indicate whether the entire context of the terminal device #1A is requested; or the indication information may be used to indicate whether only the dedicated context of the terminal device #1A is requested. For example, if the terminal device #1B already accesses the second access network device before S405, it indicates that the second access network device already stores the common context corresponding to the group identifier #1. In this case, the indication information is used to indicate that only the dedicated context of the terminal device #1A, that is, the dedicated context corresponding to the identifier #A, is requested. It should be understood that an example in which the indication information is used to indicate that only the dedicated context of the terminal device #1A is requested is used for description herein. However, whether the indication information is used to indicate that only the dedicated context of the terminal device #1A is requested is not limited in this application.

S406: The first access network device sends the dedicated context of the terminal device #1A to the second access network device.

For example, the first access network device sends only the dedicated context of the terminal device #1A to the second access network device based on the indication information sent by the second access network device. Because the first access network device does not need to send the common context corresponding to the group identifier #1 again, signaling overheads can be reduced.

It should be understood that, if the indication information in S405 is further used to indicate that the common context is requested, the first access network device may further send, in S406, the common context corresponding to the group identifier #1. This is not limited in an embodiment of the application.

Therefore, according to the communications method in an embodiment of the application, terminal devices are gathered in a group, so that a context of each terminal device includes a common context corresponding to the group and a dedicated context corresponding to the terminal device. All terminal devices in each group share a same common context, and each terminal device uses a dedicated context. In this way, when maintaining or interacting by using contexts of the terminal devices, an access network device does not need to store or transmit content of the entire context of each terminal device, so that resource requirements of the access network device on maintaining contexts can be reduced.

The foregoing mainly describes interaction between the terminal device and the access network device based on the group identifier. It is easily understood that the access network device and the core network device may also interact based on the group identifier. The following provides detailed descriptions with reference to a communications method 500 shown in FIG. 5 and a communications method 600 shown in FIG. 6.

Figure 5:
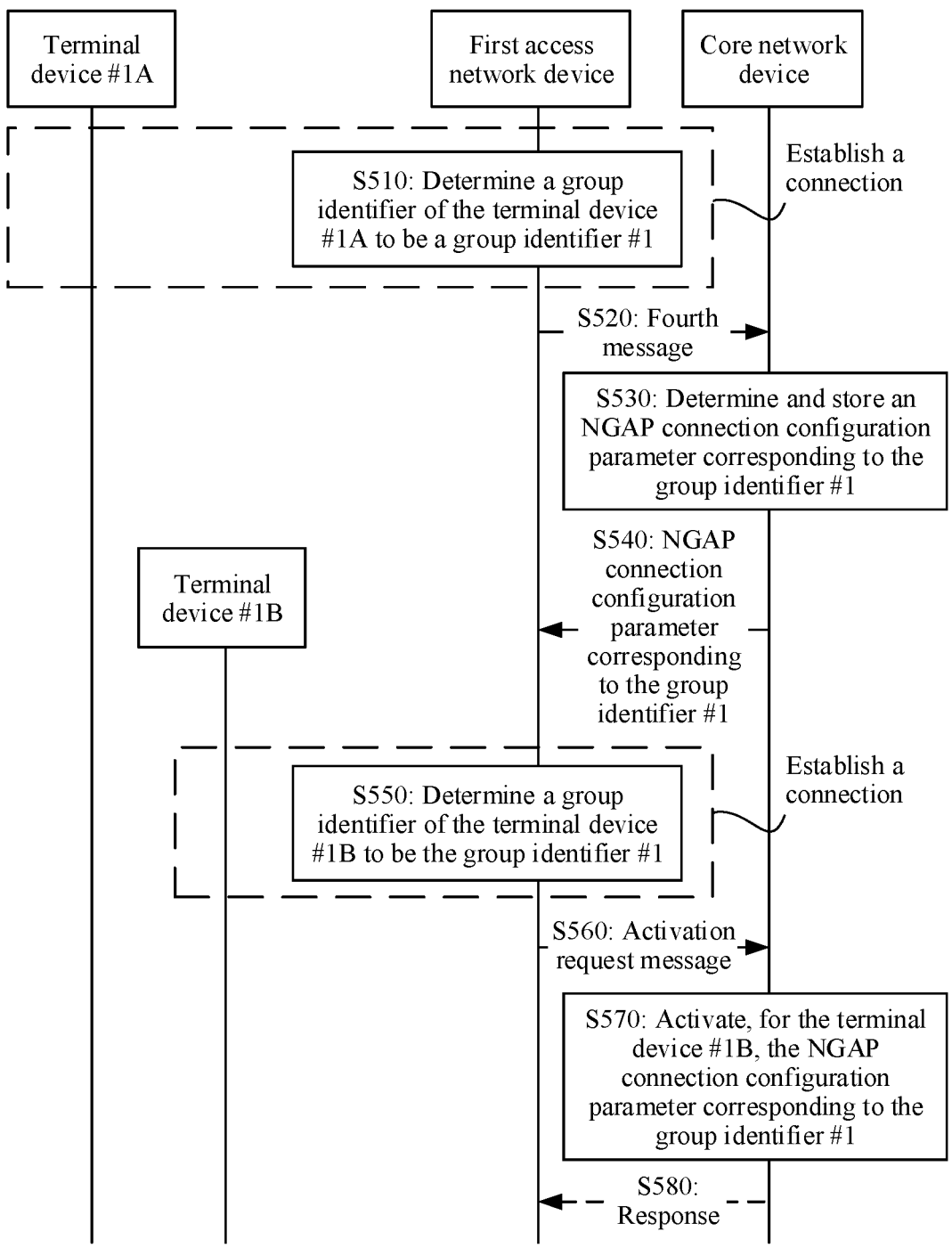
FIG. 5 is a schematic flowchart of a communications method according to an embodiment of the application.

FIG. 5 shows a communications method according to an embodiment of the application. The method may be used in a scenario in which an access network device allocates a group identifier to a terminal device.

S510: A first access network device determines a group identifier of a terminal device #1A to be a group identifier #1.

When the first access network device establishes a connection to the terminal device #1A or after obtaining attribute information of the terminal device #1A, the first access network device may allocate the group identifier #1 to the terminal device #1A. For example, the first access network device may allocate the group identifier #1 to the terminal device #1A based on the attribute information of the terminal device #1A. For details, refer to the foregoing descriptions. Details are not described herein again.

S520: The first access network device sends a fourth message to a core network device.

The fourth message includes the group identifier #1, and the fourth message is used to request the core network device to configure an NGAP connection configuration parameter corresponding to the group identifier #1.

In an embodiment, the NGAP connection configuration parameter includes at least one of a PDU session resource configuration, a QoS flow configuration, and a DRB configuration.

S530: The core network device determines and stores the NGAP connection configuration parameter corresponding to the group identifier #1.

S540: The core network device sends the NGAP connection configuration parameter corresponding to the group identifier #1 to the first access network device.

Correspondingly, after receiving the NGAP connection configuration parameter corresponding to the group identifier #1, the first access network device stores the NGAP connection configuration parameter corresponding to the group identifier #1.

S550: The first access network device determines a group identifier of a terminal device #1B to be the group identifier #1.

When the first access network device establishes a connection to the terminal device #1B or after obtaining attribute information of the terminal device #1B, the first access network device may allocate the group identifier #1 to the terminal device #1B.

Further, the first access network device may further allocate an identifier (namely, an identifier #B) of the terminal device #1B to the terminal device #1B. For example, the first access network device may allocate the group identifier #1 to the terminal device #1B based on the attribute information of the terminal device #1B. For how the first access network device allocates the group identifier to the terminal device #1B, refer to the foregoing descriptions of determining the group identifier of the terminal device #1A. Details are not described herein again.

S560: The first access network device sends an activation request message to the core network device.

The activation request message is used to request the core network device to activate, for the terminal device #1B, the NGAP connection configuration parameter corresponding to the group identifier #1. The activation request message may carry the group identifier #1.

In an embodiment, the activation request message may further carry identification information used by the core network device to identify the terminal device #1B. The identification information used by the core network device to identify the terminal device may be at least one of an international mobile subscriber identity (IMSI), a system architecture evolution temporary mobile subscriber identity (S-TMSI), and other identification information related to the IMSI or the S-TMSI.

S570: The core network device activates, for the terminal device #1B based on the activation request message, the NGAP connection configuration parameter corresponding to the group identifier #1.

In an embodiment, the method may further include the following operation:

S580: The core network device sends a response to the first access network device.

After the first access network device receives the response, where the response may be an acknowledgment message, a failure message, or a reject message, when the response is the acknowledgment message, the first access network device may determine that the core network device has activated, for the terminal device #1B, the NGAP connection configuration parameter corresponding to the group identifier #1.

Therefore, according to the communications method in an embodiment of the application, terminal devices are grouped, and a same NGAP connection configuration parameter is configured for the terminal devices in a same group, to reduce a quantity of times of NGAP connection establishment. Because the core network device needs to store only one set of NGAP connection configuration parameters corresponding to each group, and does not need to store an NGAP connection configuration parameter of each terminal device, storage resources of the core network device can be saved.

Figure 6:
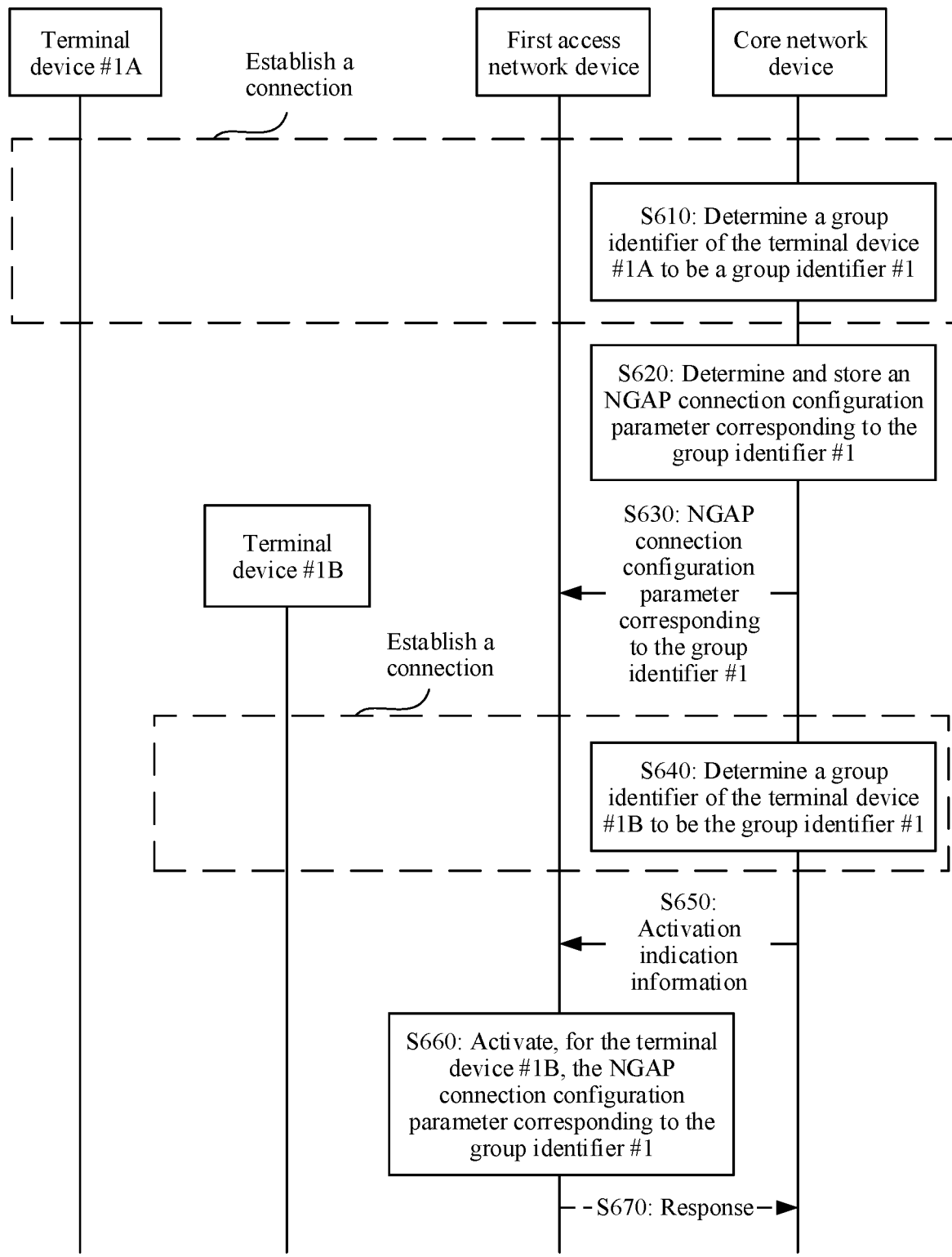
FIG. 6 is a schematic flowchart of another communications method according to an embodiment of the application.

FIG. 6 shows a communications method according to an embodiment of the application. The method may be used in a scenario in which a core network device allocates a group identifier to a terminal device.

S610: The core network device determines a group identifier of a terminal device #1A to be a group identifier #1.

In a process in which a first access network device accesses a network, the terminal device #1A needs to establish an NGAP connection to the core network device. In a process of establishing an NGAP connection between the core network device and the terminal device #1A, the core network device may determine the group identifier #1 for the terminal device #1A. For example, the core network device may determine the group identifier #1 for the terminal device #1A based on attribute information of the terminal device #1A. A manner used by the core network device to determine the group identifier for the terminal device #1A is similar to that described above, and only execution bodies of determining the group identifier are different. Manners and principles of determining the group identifier are similar, and details are not described herein again.

S620: The core network device determines and stores the NGAP connection configuration parameter corresponding to the group identifier #1.

For details of the NGAP connection configuration parameter, refer to the foregoing description. Details are not described herein again.

S630: The core network device sends the group identifier #1 and the NGAP connection configuration parameter corresponding to the group identifier #1 to the first access network device.

Correspondingly, after receiving the NGAP connection configuration parameter corresponding to the group identifier #1, the first access network device stores the NGAP connection configuration parameter corresponding to the group identifier #1.

S640: The core network device determines a group identifier of a terminal device #1B to be the group identifier #1.

When the core network device establishes an NGAP between the core network device and the terminal device #1B, the core network device may determine the group identifier #1 for the terminal device #1B. A manner used by the core network device to determine the group identifier for the terminal device #1B is similar to that in S220, and only execution bodies of determining the group identifier are different. Manners and principles of determining the group identifier are similar, and details are not described herein again.

S650: The core network device sends activation indication information to the first access network device.

The activation indication information is used to indicate the first access network device to activate, for the terminal device #1B, the NGAP connection configuration parameter corresponding to the group identifier #1. The activation indication information may carry the group identifier #1, and is used by the first access network device to determine a group identifier that needs to activate an NGAP connection configuration parameter.

S660: The first access network device activates, for the terminal device #1B based on the activation indication information, the NGAP connection configuration parameter corresponding to the group identifier #1.

In an embodiment, the method may further include the following operation:

S670: The first access network device sends a response to the core network device.

After the first access network device receives the response, where the response may be an acknowledgment message, a failure message, or a reject message, when the response is the acknowledgment message, the core network device may determine that the first access network device has activated, for the terminal device #1B, the NGAP connection configuration parameter corresponding to the group identifier #1.

Therefore, according to the communications method in an embodiment of the application, terminal devices are grouped, and a same NGAP connection configuration parameter is configured for the terminal devices in a same group, to reduce a quantity of times of NGAP connection establishment, so that signaling overheads can be reduced. Because the core network device needs to store only one set of NGAP connection configuration parameters corresponding to each group, and does not need to store an NGAP connection configuration parameter of each terminal device, storage resources of the core network device can be saved.

Figure 7:
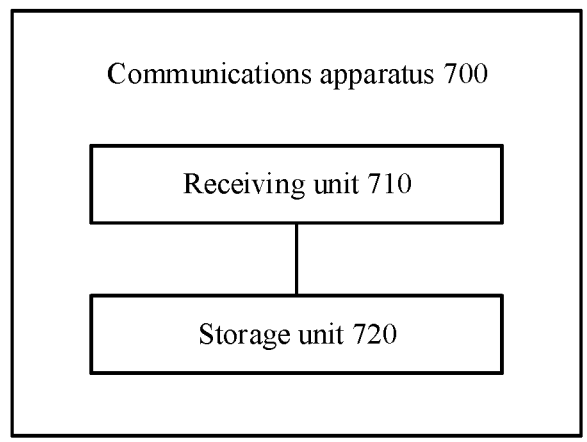
FIG. 7 is a schematic block diagram of a communications apparatus according to an embodiment of the application.

FIG. 7 is a schematic diagram of a structure of a communications apparatus according to an embodiment of this application. The communications apparatus may be a terminal device, or may be a component (for example, a chip or a circuit) that can be used in a terminal device. The communications apparatus may be configured to implement procedures or operations performed by the terminal device in the foregoing method embodiments.

As shown in FIG. 7, a communications apparatus 700 may include a receiving unit 710 and a storage unit 720.

In an embodiment, the receiving unit 710 is configured to receive a first message from a first access network device, where the first message includes a group identifier corresponding to the communications apparatus and an identifier of the communications apparatus, the group identifier is used to identify a group to which the communications apparatus belongs, the identifier of the communications apparatus is used to identify the communications apparatus in the group to which the communications apparatus belongs, the group identifier corresponds to a common context, the common context is shared by all communications apparatuses in the group to which the communications apparatus belongs, and the identifier of the communications apparatus corresponds to a dedicated context of the communications apparatus.

In an embodiment, the storage unit 720 is configured to store the group identifier and the identifier of the communications apparatus.

In an embodiment, the receiving unit 710 may be implemented by a transmitter, and the storage unit 720 may be implemented by a memory. For functions and beneficial effects of the storage unit 720 and the receiving unit 710, refer to the description of the terminal device #1A in the foregoing methods. Details are not described herein again.

In an embodiment, a communications apparatus is further provided, where the communications apparatus may be a terminal device, or may be a component (for example, a chip or a circuit) that can be used in a terminal device. The communications apparatus may include a transceiver and a memory, and in an embodiment, may further include a processor. The memory may be configured to implement a corresponding function and operation of the storage unit 720, and the transceiver is configured to implement a corresponding function and operation of the receiving unit 710. In an embodiment, the memory may further be configured to store an execution instruction or application program code, and the processor controls execution, to implement the communications method corresponding to the terminal device in the embodiments of this application; and/or the memory may be configured to temporarily store some data, instruction information, and the like. The memory may exist independently of the processor. In this case, the memory may be connected to the processor through a communication line. In an embodiment, the memory may alternatively be integrated with the processor. This is not limited in an embodiment of the application.

Figure 8:
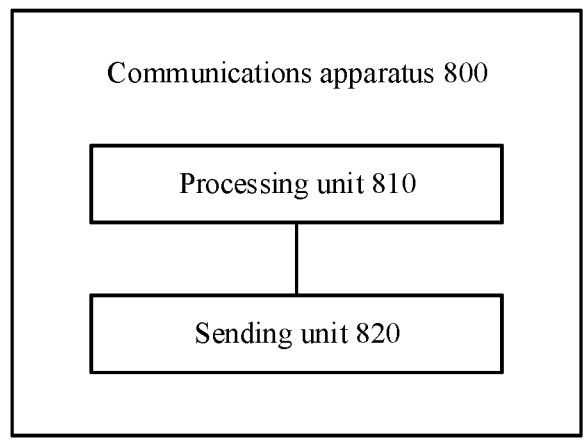
FIG. 8 is a schematic block diagram of a communications apparatus according to an embodiment of the application.

FIG. 8 is a schematic diagram of a structure of a communications apparatus according to an embodiment of this application. The communications apparatus may be an access network device, or may be a component (for example, a chip or a circuit) that can be used in an access network device. The communications apparatus may be configured to implement procedures or operations performed by the first access network device corresponding to the method embodiment shown in FIG. 2, FIG. 4, FIG. 5, or FIG. 6.

As shown in FIG. 8, the communications apparatus 800 includes a processing unit 810 and a sending unit 820.

When the communications apparatus 800 is configured to implement the method embodiment shown in FIG. 2 or FIG. 4, the processing unit 810 is configured to determine a group identifier corresponding to a terminal device and an identifier of the terminal device, where the group identifier is used to identify a group to which the terminal device belongs, the identifier of the terminal device is used to identify the terminal device in the group to which the terminal device belongs, the group identifier corresponds to a common context, the common context is shared by all terminal devices in the group to which the terminal device belongs, and the identifier of the terminal device corresponds to a dedicated context of the terminal device.

In an embodiment, the sending unit 820 is configured to send a first message to the terminal device, where the first message includes the group identifier and the identifier of the terminal device.

In an embodiment, when the communications apparatus 800 is configured to implement the method embodiment shown in FIG. 5, the processing unit 810 is configured to determine a group identifier corresponding to a terminal device #1A, and may further be configured to determine a group identifier of the terminal device #1B. The sending unit 820 may be configured to send a fourth message to a core network device, and may further send an activation request message to the core network device, where the activation request message may carry the group identifier, and is used to request an NGAP connection configuration parameter corresponding to the group identifier.

In an embodiment, the communications apparatus 800 may further include a receiving unit, configured to receive the NGAP configuration parameter corresponding to the group identifier from the core network device.

When the communications apparatus 800 is configured to implement the method shown in FIG. 6, the receiving unit is configured to receive a group identifier #1 and an NGAP connection configuration parameter corresponding to the group identifier #1, and in an embodiment, may further be configured to receive activation indication information from a core network device, where the activation indication information is used to indicate a first access network device to activate, for a terminal device #1B, the NGAP connection configuration parameter corresponding to the group identifier #1. The processing unit 810 is configured to activate, for the terminal device #1B based on the activation indication information, the NGAP connection configuration parameter corresponding to the group identifier #1. The sending unit 820 is configured to send a response to the core network device.

In an embodiment, the sending unit 820 may be implemented by a transmitter, the processing unit 810 may be implemented by a processor, and the receiving unit may be implemented by a receiver. The receiver and the transmitter may be separately disposed, or may be integrated (and referred to as a transceiver).

It may be understood that for functions and beneficial effects of the processing unit 810, the sending unit 820, and the receiving unit, refer to the foregoing descriptions of the first access network device in the method shown in FIG. 2, FIG. 4, FIG. 5, or FIG. 6. Details are not described herein again.

In an embodiment, a communications apparatus is further provided, where the communications apparatus may be an access network device, or may be a component (for example, a chip or a circuit) that can be used in an access network device. The communications apparatus may include a processor and a transceiver, and in an embodiment, may further include a memory. The processor may be configured to implement a corresponding function and operation of the processing unit 810, and the transceiver is configured to implement a corresponding function and operation of the sending unit 820. The memory may be configured to store an execution instruction or application program code, and the processor controls execution, to implement the communications method provided in FIG. 2, FIG. 4, FIG. 5, or FIG. 6 of this application; and/or may be configured to store some data, instruction information, information received by the transceiver, or the like. The memory may exist independently of the processor. In this case, the memory may be connected to the processor through a communication line. In an embodiment, the memory may alternatively be integrated with the processor. This is not limited in an embodiment of the application.

Figure 9:
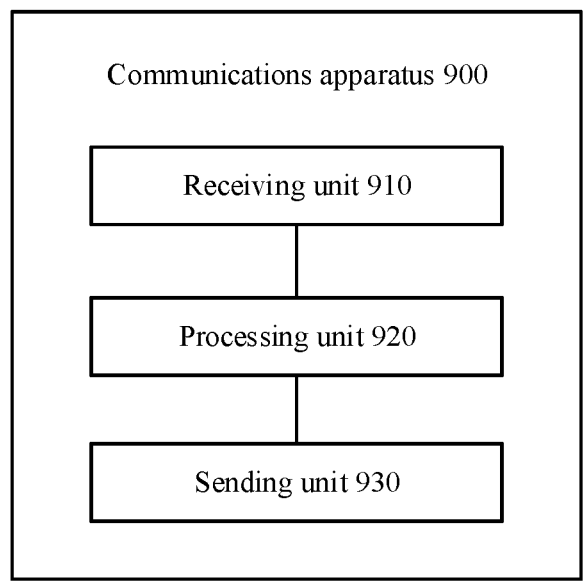
FIG. 9 is a schematic block diagram of another communications device according to an embodiment of the application.

FIG. 9 is a block diagram of a structure of a communications apparatus according to an embodiment of this application. As shown in FIG. 9, the communications apparatus 900 includes a receiving unit 910, a processing unit 920, and a sending unit 930. The communications apparatus 900 may be an access network device, or may be a component (for example, a circuit or a chip) that can be used in an access network device. The communications apparatus may be configured to implement procedures or operations performed by the second access network device in any one of the foregoing method embodiments.

In an embodiment, the receiving unit 910 is configured to receive a second message from a terminal device, where the second message is used by the terminal device to request to access the communications apparatus.

In an embodiment, the processing unit 920 is configured to determine, based on the second message, a group identifier corresponding to the terminal device and an identifier of the terminal device, where the group identifier is used to identify a group to which the terminal device belongs, the identifier of the terminal device is used to identify the terminal device in the group to which the terminal device belongs, and the identifier of the terminal device corresponds to a dedicated context of the terminal device. In an embodiment, the sending unit 930 is configured to send a third message to the first access network device, where the third message includes the group identifier and the identifier of the terminal device, and the third message is used to request a dedicated context corresponding to the identifier of the terminal device. In an embodiment, the receiving unit 910 is further configured to receive a third response message from the first access network device, where the third response message includes the dedicated context. In an embodiment, the receiving unit 910 and the sending unit 930 may be implemented by a transmitter.

The processing unit 920 may be implemented by a processor. For functions and beneficial effects of the receiving unit 910, the processing unit 920, and the sending unit 930, refer to the foregoing descriptions of the second access network device in the method shown in FIG. 3. Details are not described herein again.

In an embodiment, a communications apparatus is further provided, where the communications apparatus may be an access network device, or may be a component (for example, a chip or a circuit) that can be used in an access network device. The communications apparatus may include a transceiver and a processor, and in an embodiment, may further include a memory. The transceiver may be configured to implement corresponding functions and operations corresponding to the receiving unit 910 and the sending unit 930, and the processor may be configured to implement a corresponding function and operation of the processing unit 920. The memory may be configured to store an execution instruction or application program code, and the processor controls execution, to implement the method provided in FIG. 3 or FIG. 4; and/or may be configured to store some data, instruction information, information received by the transceiver, or the like. The memory may exist independently of the processor. In this case, the memory may be connected to the processor through a communication line. In an embodiment, the memory may alternatively be integrated with the processor. This is not limited in an embodiment of the application.

Figure 10:
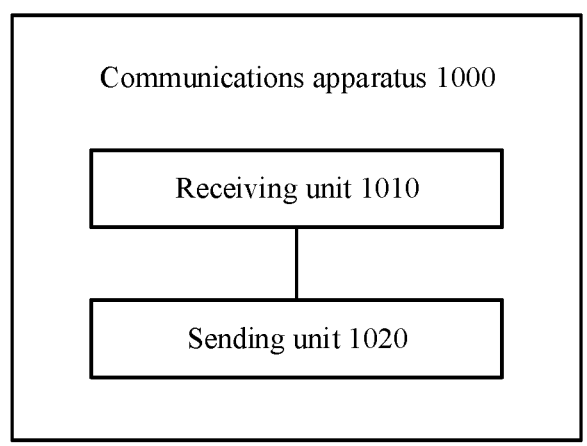
FIG. 10 is a schematic block diagram of another communications device according to an embodiment of the application.

FIG. 10 is a block diagram of a structure of a communications apparatus according to an embodiment of this application. As shown in FIG. 10, the communications apparatus 1000 includes a receiving unit 1010 and a sending unit 1020. The communications apparatus 1000 may be an access network device, or may be a component (for example, a circuit or a chip) that can be used in an access network device. The communications apparatus may be configured to implement procedures or operations performed by the first access network device in the method embodiment shown in FIG. 3.

The receiving unit 1010 is configured to receive a third message from a second access network device, where the third message includes a group identifier corresponding to a terminal device and an identifier of the terminal device, the group identifier is used to identify a group to which the terminal device belongs, the identifier of the terminal device is used to identify the terminal device in the group to which the terminal device belongs, and the identifier of the terminal device corresponds to a dedicated context of the terminal device.

The sending unit 1020 is configured to send a third response message, where the third response message includes the dedicated context.

In an embodiment, the receiving unit 1010 and the sending unit 1020 may be implemented by a transceiver. For functions and beneficial effects of the receiving unit 1010 and the sending unit 1020, refer to the foregoing descriptions of the first access network device in the method shown in FIG. 3. Details are not described herein again.

It may be understood that the communications apparatus shown in FIG. 10 may further implement the method in any one of the embodiments shown in FIG. 2 or FIG. 4 to FIG. 6.

In an embodiment, a communications apparatus is further provided, where the communications apparatus may be an access network device, or may be a component (for example, a chip or a circuit) that can be used in an access network device. The communications apparatus may include a transceiver, and in an embodiment, may further include a processor and a memory. The transceiver may be configured to implement corresponding functions and operations of the receiving unit 1010 and the sending unit 1020. The memory may be configured to store an execution instruction or application program code, and the processor controls execution, to implement the method provided in FIG. 3; and/or may be configured to store some data, instruction information, information received by the transceiver, or the like. The memory may exist independently of the processor. In this case, the memory may be connected to the processor through a communication line. In an embodiment, the memory may alternatively be integrated with the processor. This is not limited in an embodiment of the application. Further, the communications apparatus may further implement the method in any one of the embodiments shown in FIG. 2 or FIG. 4 to FIG. 6.

Figure 11:
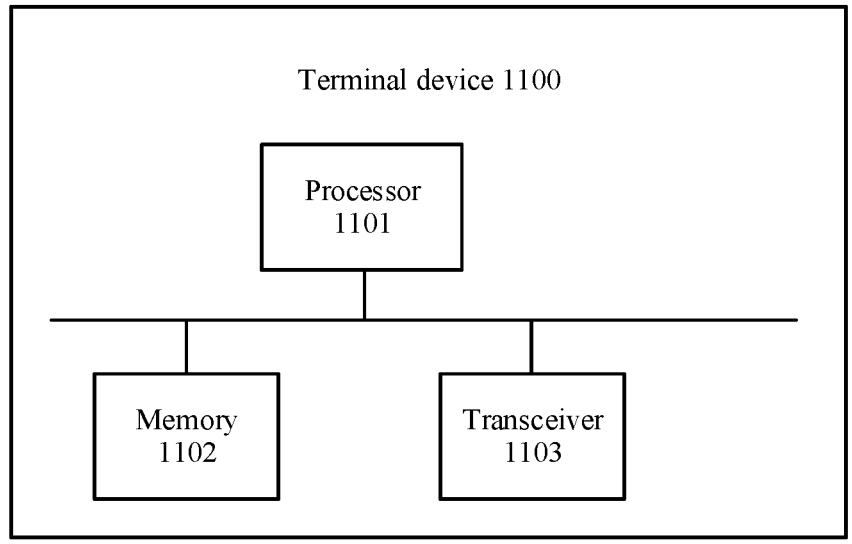
FIG. 11 is a block diagram of a structure of a terminal device according to an embodiment of the present application.

FIG. 11 is a block diagram of a structure of a terminal device according to an embodiment of the present application. As shown in FIG. 11, the terminal device 1100 includes a processor 1101, a memory 1102, a radio frequency circuit, an antenna, and an input/output apparatus. The processor 1101 may be configured to: process a communication protocol and communication data, and control the terminal to execute a software program, process data of the software program, and the like. The memory 1102 is mainly configured to store the software program and the data. The radio frequency circuit is mainly configured to: perform conversion between a baseband signal and a radio frequency signal, and process the radio frequency signal. The antenna is mainly configured to receive and send a radio frequency signal in an electromagnetic wave form. The input/output apparatus, for example, a touchscreen, a display, or a keyboard, is mainly configured to receive data input by a user and output data to the user. It should be noted that some types of terminals may not have an input/output apparatus.

When the data needs to be sent, after performing baseband processing on the to-be-sent data, the processor 1101 outputs the baseband signal to the radio frequency circuit. After performing radio frequency processing on the baseband signal, the radio frequency circuit sends the radio frequency signal in the electromagnetic wave form through the antenna. When data is sent to the terminal device, the radio frequency circuit receives the radio frequency signal through the antenna, converts the radio frequency signal into the baseband signal, and outputs the baseband signal to the processor. The processor converts the baseband signal into data, and processes the data. For ease of description, FIG. 11 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in an embodiment of the application.

In an embodiment of the application, the antenna and the radio frequency circuit that have receiving and sending functions may be considered as a transceiver 1103 of the terminal, and the processor that has a processing function may be considered as a processing unit of the terminal device. The transceiver may also be referred to as a transceiver unit, a transceiver machine, a transceiver apparatus, or the like. The processing unit may also be referred to as a processor, a processing board, a processing module, a processing apparatus, or the like. In an embodiment, a component that is in the transceiver 1103 and that is configured to implement a receiving function may be considered as a receiving unit, and a component that is in the transceiver 1103 and that is configured to implement a sending function may be considered as a sending unit. In other words, the transceiver 1103 includes a receiving unit and a sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The processor 1101, the memory 1102, and the transceiver 1103 communicate with each other through an internal connection path, to transfer a control and/or data signal.

The method disclosed in the foregoing embodiments of the present application may be applied to the processor 1101, or implemented by the processor 1101. The processor 1101 may be an integrated circuit chip and has a signal processing capability. In an embodiment, operations in the foregoing methods may be implemented by using a hardware integrated logical circuit in the processor 1101 or by using instructions in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, operations, and logical block diagrams that are disclosed in the embodiments of the present application. The general-purpose processor may be a microprocessor, or the processor may be any conventional processor or the like. The operations of the methods disclosed with reference to the embodiments of the present application may be directly performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads an instruction in the memory and completes the operations in the foregoing methods in combination with hardware in the processor.

In an embodiment, in some embodiments, the memory 1102 may store an instruction used to perform the method performed by the terminal device in the method shown in FIG. 2 or FIG. 3. The processor 1101 may execute the instruction stored in the memory 1102 to complete, in combination with another hardware (for example, the transceiver 1103), operations performed by the terminal device in the method shown in FIG. 2 or FIG. 3. For a working process and beneficial effects, refer to the descriptions in the embodiment shown in FIG. 2 or FIG. 3.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform a method on a terminal device side in the foregoing method embodiments.

An embodiment of this application further provides a computer-readable storage medium, where the computer-readable storage medium stores an instruction, and when the instruction is executed, a method on a terminal device side in the foregoing method embodiments is performed.

An embodiment of this application further provides a computer program product including an instruction, where when the instruction is executed, a method on a terminal device side in the foregoing method embodiments is performed.

Figure 12:
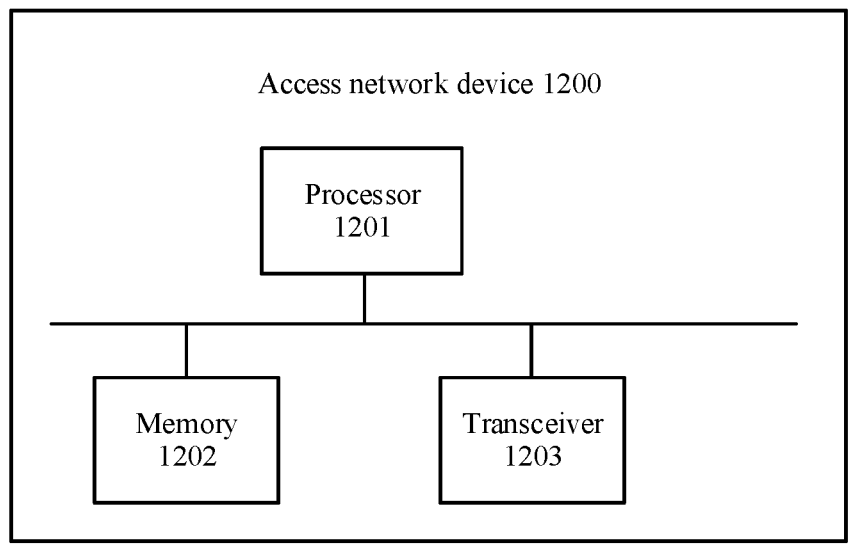
FIG. 12 is a block diagram of a structure of an access network device according to an embodiment of the present application.

FIG. 12 is a block diagram of a structure of an access network device according to an embodiment of the present application. The access network device 1200 shown in FIG. 12 includes a processor 1201, a memory 1202, and a transceiver 1203.

The processor 1201, the memory 1202, and the transceiver 1203 communicate with each other through an internal connection path, to transfer a control and/or data signal.

The method disclosed in the foregoing embodiments of the present application may be applied to the processor 1201, or implemented by the processor 1201. The processor 1201 may be an integrated circuit chip and has a signal processing capability. In an embodiment, operations in the foregoing methods may be implemented by using a hardware integrated logical circuit in the processor 1201 or by using instructions in a form of software. The processor 1201 may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, operations, and logical block diagrams that are disclosed in the embodiments of the present application. The general-purpose processor may be a microprocessor, or the processor may be any conventional processor or the like. The operations of the methods disclosed with reference to the embodiments of the present application may be directly performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1202, and the processor 1201 reads an instruction in the memory 1202 and completes the operations in the foregoing methods in combination with hardware in the processor.

In an embodiment, in some embodiments, the memory 1202 may store an instruction used to perform the method performed by the first access network device in the methods shown in FIG. 2 to FIG. 6, or the method performed by the second access network device in the methods shown in FIG. 3 to FIG. 6. The processor 1201 may execute the instruction stored in the memory 1202 to complete, in combination with another hardware (for example, the transceiver 1203), operations performed by the first access network device in the methods shown in FIG. 2 and FIG. 3, or operations performed by the second access network device in the methods shown in FIG. 3 to FIG. 6. For a working process and beneficial effects, refer to the descriptions in the embodiments shown in FIG. 2 to FIG. 6.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform a method performed on an access network device side in the foregoing embodiments.

In an embodiment, a computer-readable storage medium is provided, where the computer-readable storage medium stores an instruction, and when the instruction is executed, the method on the access network device side in the foregoing method embodiments is performed.

In an embodiment, a computer program product that includes an instruction is provided, where when the instruction is executed, the method on the access network device side in the foregoing method embodiments is performed.

Figure 13:
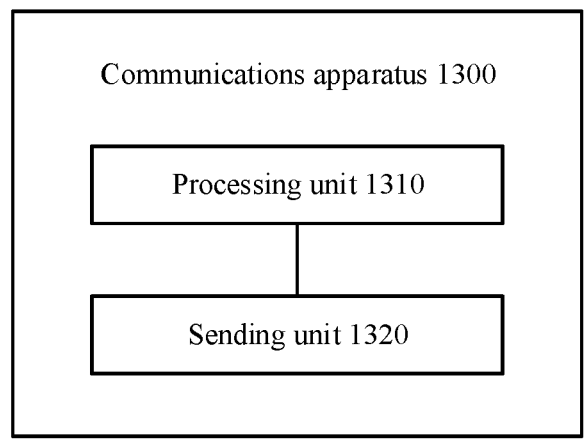
FIG. 13 is a schematic block diagram of a communications device according to an embodiment of the application.

FIG. 13 is a block diagram of a structure of a communications apparatus according to an embodiment of this application. As shown in FIG. 13, the communications apparatus 1300 includes a processing unit 1310 and a sending unit 1320. The communications apparatus 1300 may be a core network device, or may be a component (for example, a circuit or a chip) that can be used in a core network device. The communications apparatus may be configured to implement procedures or operations performed by the core network device in the foregoing method embodiments.

The processing unit 1310 is configured to determine a group identifier of a terminal device and an NGAP connection configuration parameter corresponding to the group identifier.

The sending unit 1320 is configured to send the NGAP connection configuration parameter to the first access network device.

In a possible implementation, the processing unit 1310 may be implemented by a processor, and the sending unit 1320 may be implemented by a transceiver. For functions and beneficial effects of the processing unit 1310 and the sending unit 1320, refer to the foregoing descriptions of the core network device in the method shown in FIG. 5 and FIG. 6. Details are not described herein again.

In a possible implementation, a communications apparatus is further provided, where the communications apparatus may be a core network device, or may be a component (for example, a chip or a circuit) that can be used in a core network device. The communications apparatus may include a transceiver, and in an embodiment, may further include a processor and a memory. The transceiver may be configured to implement a corresponding function and operation of the sending unit 1320. The memory may be configured to store an execution instruction or application program code, and the processor controls execution, to implement the method provided in FIG. 5 or FIG. 6; and/or may be configured to store some data, instruction information, information received by the transceiver, or the like. The memory may exist independently of the processor. In this case, the memory may be connected to the processor through a communication line. In an embodiment, the memory may alternatively be integrated with the processor. This is not limited in an embodiment of the application.

Figure 14:
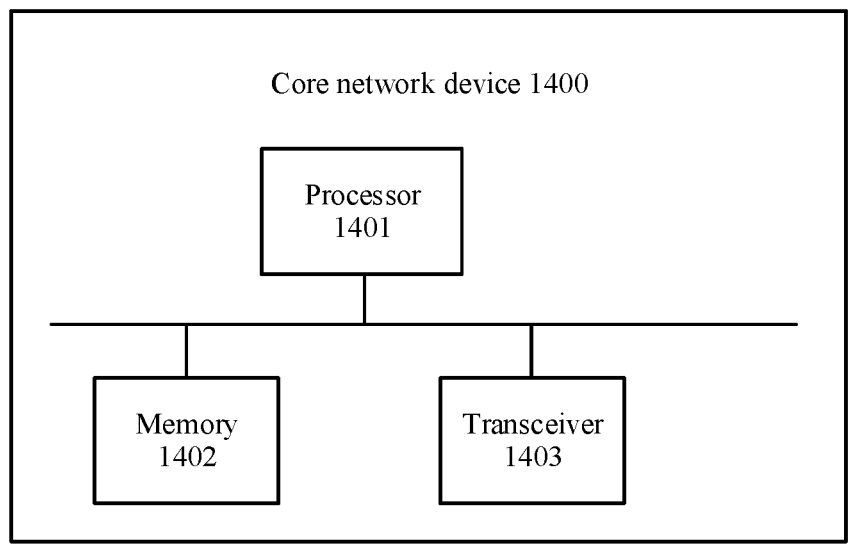
FIG. 14 is a block diagram of a structure of a core network device according to an embodiment of the present application.

FIG. 14 is a block diagram of a structure of a core network device according to an embodiment of the present application. The core network device 1400 shown in FIG. 14 includes a processor 1401, a memory 1402, and a transceiver 1403.

The processor 1401, the memory 1402, and the transceiver 1403 communicate with each other through an internal connection path, to transfer a control and/or data signal.

The method disclosed in the foregoing embodiments of the present application may be applied to the processor 1401, or implemented by the processor 1401. The processor 1401 may be an integrated circuit chip and has a signal processing capability. In an embodiment, operations in the foregoing methods may be implemented by using a hardware integrated logical circuit in the processor 1401 or by using instructions in a form of software. The processor 1401 may be a general-purpose processor, a digital signal processor (DSP), an application-specific integrated circuit (ASIC), a field programmable gate array (FPGA) or another programmable logical device, or a discrete hardware component. The processor may implement or perform the methods, operations, and logical block diagrams that are disclosed in the embodiments of the present application. The general-purpose processor may be a microprocessor, or the processor may be any conventional processor or the like. The operations of the methods disclosed with reference to the embodiments of the present application may be directly performed and completed by a hardware decoding processor, or performed and completed by a combination of hardware and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1402, and the processor 1401 reads an instruction in the memory 1402 and completes the operations in the foregoing methods in combination with hardware in the processor.

In an embodiment, in some embodiments, the memory 1402 may store an instruction used to perform the method performed by the core network device in the method shown in FIG. 5 or FIG. 6. The processor 1401 may execute the instruction stored in the memory 1402 to complete, in combination with another hardware (for example, the transceiver 1403), the method implemented by the core network device in the method shown in FIG. 5 or FIG. 6. For a working process and beneficial effects, refer to the descriptions in the embodiment shown in FIG. 5 or FIG. 6.

An embodiment of this application further provides a chip, where the chip includes a transceiver unit and a processing unit. The transceiver unit may be an input/output circuit or a communications interface. The processing unit is a processor, a microprocessor, or an integrated circuit integrated on the chip. The chip may perform a method performed on a core network device side in the foregoing embodiments.

In an embodiment, a computer-readable storage medium is provided, where the computer-readable storage medium stores an instruction, and when the instruction is executed, the method on the core network device side in the foregoing method embodiments is performed.

In another form of an embodiment, a computer program product that includes an instruction is provided, where when the instruction is executed, the method on the core network device side in the foregoing method embodiments is performed.

In this patent application, names may be assigned to various types of objects such as messages/information/devices/network elements/systems/apparatuses/actions/operations/procedures/concepts. However, these names do not constitute a limitation on related objects. The assigned names may vary with a factor such as a scenario, a context, or a usage habit. An understanding of a technical meaning of a related object should be mainly determined based on a function and a technical effect that are embodied/performed in a technical solution.

One of ordinary skilled in the art may be aware that units, algorithms, and operations in the examples described with reference to the embodiments disclosed in this application can be implemented by electronic hardware or a combination of computer software and electronic hardware. Whether the functions are performed by hardware or software depends on a particular application and a design constraint condition of the technical solutions. One of ordinary skilled in the art may use different methods to implement the described functions for each particular application, but it should not be considered that the implementation goes beyond the scope of this application.

It may be clearly understood by one of ordinary skilled in the art that, for the purpose of convenient and brief description, for detailed working processes of the system, apparatus, and unit that are described above, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. In an embodiment, the units in the embodiments of this application may also be referred to as modules.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely embodiments of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A communications method applied in a terminal device, comprising:
    receiving a first message from a first access network device, wherein the first message comprises a group identifier corresponding to a terminal device and an identifier of the terminal device, wherein the group identifier is used to identify a group to which the terminal device belongs, wherein the identifier of the terminal device is used to identify the terminal device in the group to which the terminal device belongs, wherein the group identifier corresponds to a common context shared by all terminal devices in the group to which the terminal device belongs, and wherein the identifier of the terminal device corresponds to a dedicated context of the terminal device; and storing the group identifier and the identifier of the terminal device, wherein the group includes a plurality of candidate terminal devices that include the terminal device, and wherein a context of each of the candidate terminal devices includes the common context and a dedicated context specific to the candidate terminal device.

2. The method according to claim 1, further comprising: receiving the common context from the first access network device.

3. The method according to claim 1, further comprising: receiving the dedicated context from the first access network device.

4. The method according to claim 1, further comprising: sending a second message to a second access network device, wherein the second message comprises the identifier of the terminal device and the group identifier; or the second message is carried on a physical resource corresponding to the group identifier, wherein the second message comprises the identifier of the terminal device.

5. A communications method, comprising:

determining a group identifier corresponding to a terminal device and an identifier of the terminal device, wherein the group identifier is used to identify a group to which the terminal device belongs, wherein the identifier of the terminal device is used to identify the terminal device in the group to which the terminal device belongs, wherein the group identifier corresponds to a common context shared by all terminal devices in the group to which the terminal device belongs, and wherein the identifier of the terminal device corresponds to a dedicated context of the terminal device; and sending a first message to the terminal device, wherein the first message comprises the group identifier and the identifier of the terminal device, wherein the group includes a plurality of candidate terminal devices that include the terminal device, and wherein a context of each of the candidate terminal devices includes the common context and a dedicated context specific to the candidate terminal device.

6. The method according to claim 5, further comprising: sending the common context to the terminal device.

7. The method according to claim 5, further comprising: sending the dedicated context to the terminal device.

8. The method according claim 5, further comprising: receiving a third message from a second access network device, wherein the third message comprises the group identifier and the identifier of the terminal device; and sending a third response message comprising the dedicated context.

9. The method according to claim 8, wherein the third response message further comprises the common context corresponding to the group identifier.

10. The method according to claim 8, wherein the third response message further comprises at least one of the following:

a dedicated context of another terminal device in the group corresponding to the group identifier; and attribute information of the terminal devices corresponding to the group identifier, wherein the attribute information of the terminal devices comprises at least one of the following information: quality of service attributes of services of the terminal devices, service types of the terminal devices, slice types of the terminal devices, capabilities of the terminal devices, whether the terminal devices are static, power saving requirements of the terminal devices, and latency requirements of the terminal devices.

11. The method according to claim 8, wherein the common context comprises at least one of the following information:

a quality of service (QoS) attribute, a radio resource control (RRC) configuration, a service data adaptation protocol (SDAP) configuration, a data radio bearer (DRB) configuration, a capability of the terminal devices, and a security parameter type supported by the terminal devices.

12. The method according to claim 8, wherein the third message comprises indication information used to indicate whether the common context corresponding to the group identifier is requested, or to indicate whether only the dedicated context corresponding to the identifier of the terminal device is requested, or to indicate whether an entire context of the terminal device is requested.

13. A communications method, comprising:

receiving, by a second access network device, a second message from a terminal device, wherein a group includes a plurality of candidate terminal devices that include the terminal device, and wherein a context of each of the candidate terminal devices includes a common context and a dedicated context specific to the candidate terminal device, wherein the second message is usable for the terminal device to request to access the second access network device;

determining, by the second access network device based on the second message, a group identifier corresponding to the terminal device and an identifier of the terminal device, wherein the group identifier is used to identify the group to which the terminal device belongs, wherein the identifier of the terminal device is used to identify the terminal device in the group to which the terminal device belongs, and wherein the identifier of the terminal device corresponds to the dedicated context of the terminal device;

sending, by the second access network device, a third message to a first access network device, wherein the third message comprises the group identifier and the identifier of the terminal device; and receiving, by the second access network device, a third response message from the first access network device, wherein the third response message comprises the dedicated context.

14. The method according to claim 13, wherein the third response message further comprises the common context corresponding to the group identifier.

15. The method according to claim 13, wherein the second message comprises the identifier of the terminal device and the group identifier; or the second message comprises the identifier of the terminal device, wherein the second message is carried on a physical resource corresponding to the group identifier.

16. The method according to claim 13, wherein the second message further comprises short message authentication code integrity information determined by the terminal device based on a physical cell identifier of a first serving cell, a cell identifier of a second serving cell, and the group identifier.

17. The method according to claim 13, wherein the third response message further comprises at least one of the following:
   a dedicated context of another terminal device in the group corresponding to the group identifier; and
   attribute information of terminal devices corresponding to the group identifier, wherein
   the attribute information of terminal devices comprises at least one of the following information: quality of service attributes of services of the terminal devices, service types of the terminal devices, slice types of the terminal devices, capabilities of the terminal devices, whether the terminal devices are static, power saving requirements of the terminal devices, and latency requirements of the terminal devices.

18. The method according to claim 13, wherein the common context comprises at least one of the following information:
   a quality of service (QoS) attribute, a radio resource control (RRC) configuration, a service data adaptation protocol (SDAP) configuration, a data radio bearer (DRB) configuration, a capability of terminal devices, and a security parameter type supported by the terminal devices.

19. The method according to claim 13, wherein the third message comprises indication information to indicate whether the common context corresponding to the group identifier is requested, or to indicate whether only the dedicated context corresponding to the identifier of the terminal device is requested, or to indicate whether an entire context of the terminal device is requested.

* * * * *